US010984097B2

(12) United States Patent
Ghosh et al.

(10) Patent No.: US 10,984,097 B2
(45) Date of Patent: *Apr. 20, 2021

(54) METHODS AND APPARATUS FOR CONTROL AND DETECTION OF MALICIOUS CONTENT USING A SANDBOX ENVIRONMENT

(71) Applicant: Invincea, Inc., Reston, VA (US)

(72) Inventors: Anup Ghosh, Centreville, VA (US); Scott Cosby, Alexandria, VA (US); Alan Keister, Oakton, VA (US); Benjamin Bryant, Alexandria, VA (US); Stephen Taylor, Washington, DC (US)

(73) Assignee: Invincea, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,664

(22) Filed: Nov. 1, 2019

(65) Prior Publication Data
US 2020/0242236 A1 Jul. 30, 2020

Related U.S. Application Data

(63) Continuation of application No. 16/018,720, filed on Jun. 26, 2018, now Pat. No. 10,467,406, which is a
(Continued)

(51) Int. Cl.
*G06F 21/53* (2013.01)
*G06F 21/56* (2013.01)

(52) U.S. Cl.
CPC .............. *G06F 21/53* (2013.01); *G06F 21/56* (2013.01); *G06F 21/566* (2013.01);
(Continued)

(58) Field of Classification Search
CPC ......... G06F 21/53; G06F 21/56; G06F 21/566
See application file for complete search history.

(56) References Cited

U.S. PATENT DOCUMENTS 5,297,269 A 5/1994 Donaldson et al.
5,394,555 A 2/1995 Hunter et al.
(Continued)

FOREIGN PATENT DOCUMENTS

WO WO 20021021274 3/2002
WO WO 2003/067435 8/2003
(Continued)

OTHER PUBLICATIONS

Office Action for U.S. Appl. No. 13/690,452, dated Nov. 8, 2013, 12 pages.
(Continued)

*Primary Examiner* — Hee K Song
(74) *Attorney, Agent, or Firm* — Cooley LLP

(57) ABSTRACT

A non-transitory processor-readable medium storing code representing instructions to cause a processor to perform a process includes code to cause the processor to receive a set of indications of allowed behavior associated with an application. The processor is also caused to initiate an instance of the application within a sandbox environment. The processor is further caused to receive, from a monitor module associated with the sandbox environment, a set of indications of actual behavior of the instance of the application in response to initiating the instance of the application within the sandbox environment. The processor is also caused to send an indication associated with an anomalous behavior if at least one indication from the set of indications of actual behavior does not correspond to an indication from the set of indications of allowed behavior.

22 Claims, 7 Drawing Sheets

Related U.S. Application Data continuation of application No. 15/359,004, filed on Nov. 22, 2016, now Pat. No. 10,043,001, which is a continuation of application No. 14/797,847, filed on Jul. 13, 2015, now Pat. No. 9,519,779, which is a continuation of application No. 13/690,452, filed on Nov. 30, 2012, now Pat. No. 9,081,959.

(60) Provisional application No. 61/566,162, filed on Dec. 2, 2011.

(52) U.S. Cl.
CPC .............. *G06F 2221/034* (2013.01); *G06F 2221/2101* (2013.01); *G06F 2221/2141* (2013.01); *G06F 2221/2149* (2013.01)

(56) References Cited

U.S. PATENT DOCUMENTS

| | | |
|---|---|---|
| 5,696,822 A | 12/1997 | Nachenberg |
| 5,842,002 A | 11/1998 | Schnurer et al. |
| 5,854,916 A | 12/1998 | Nachenberg |
| 5,895,467 A | 4/1999 | Ubell et al. |
| 5,974,549 A | 10/1999 | Golan |
| 6,067,410 A | 5/2000 | Nachenberg |
| 6,157,721 A | 12/2000 | Shear et al. |
| 6,211,871 B1 | 4/2001 | Himmel et al. |
| 6,377,959 B1 | 4/2002 | Carlson |
| 6,397,242 B1 | 5/2002 | Devine et al. |
| 6,496,847 B1 | 12/2002 | Bugnion et al. |
| 6,584,495 B1 | 6/2003 | Bisset et al. |
| 6,718,482 B2 | 4/2004 | Sato et al. |
| 6,832,120 B1 | 12/2004 | Frank et al. |
| 6,845,464 B2 | 1/2005 | Gold |
| 6,859,889 B2 | 2/2005 | Matsuura et al. |
| 6,880,110 B2 | 4/2005 | Largman et al. |
| 6,883,098 B1 | 4/2005 | Roman et al. |
| 6,944,785 B2 | 9/2005 | Gadir et al. |
| 7,058,822 B2 | 6/2006 | Edery et al. |
| 7,086,090 B1 | 8/2006 | Dawson, Jr. et al. |
| 7,096,381 B2 | 8/2006 | Largman et al. |
| 7,100,075 B2 | 8/2006 | Largman et al. |
| 7,111,201 B2 | 9/2006 | Largman et al. |
| 7,137,034 B2 | 11/2006 | Largman et al. |
| 7,363,264 B1 | 4/2008 | Doughty et al. |
| 7,392,541 B2 | 6/2008 | Largman et al. |
| 7,536,598 B2 | 5/2009 | Largman et al. |
| 7,552,479 B1 | 6/2009 | Conover et al. |
| 7,571,353 B2 | 8/2009 | Largman et al. |
| 7,577,871 B2 | 8/2009 | Largman et al. |
| 7,584,503 B1 | 9/2009 | Palmer et al. |
| 7,633,864 B2 | 12/2009 | Johnson et al. |
| 7,693,991 B2 | 4/2010 | Greenlee et al. |
| 7,698,744 B2 | 4/2010 | Fanton et al. |
| 7,788,699 B2 | 8/2010 | Largman et al. |
| 7,836,303 B2 | 11/2010 | Levy et al. |
| 7,840,801 B2 | 11/2010 | Berger et al. |
| 7,849,360 B2 | 12/2010 | Largman et al. |
| 7,873,635 B2 | 1/2011 | Wang et al. |
| 7,899,867 B1 | 3/2011 | Sherstinsky et al. |
| 7,904,797 B2 | 3/2011 | Wong |
| 7,941,813 B1 | 5/2011 | Protassov et al. |
| 7,979,889 B2 | 7/2011 | Gladstone et al. |
| 8,001,606 B1 * | 8/2011 | Spertus ............... G06F 21/564 726/25 |
| 8,078,740 B2 | 12/2011 | Franco et al. |
| 8,196,205 B2 | 6/2012 | Gribble et al. |
| 8,234,640 B1 | 7/2012 | Fitzgerald et al. |
| 8,290,763 B1 | 10/2012 | Zhang |
| 8,356,352 B1 | 1/2013 | Wawda et al. |
| 8,370,931 B1 | 2/2013 | Chien et al. |
| 8,401,982 B1 | 3/2013 | Satish et al. |
| 8,447,880 B2 | 5/2013 | Johnson et al. |
| 8,468,600 B1 | 6/2013 | Kaskel et al. |
| 8,479,286 B2 * | 7/2013 | Dalcher ............... G06F 21/566 726/22 |
| 8,572,735 B2 | 10/2013 | Ghosh et al. |
| 8,578,345 B1 | 11/2013 | Kennedy et al. |
| 8,621,458 B2 | 12/2013 | Traut et al. |
| 8,694,797 B2 | 4/2014 | Challener et al. |
| 8,719,924 B1 | 5/2014 | Williamson et al. |
| 8,775,369 B2 | 7/2014 | Largman et al. |
| 8,776,038 B2 | 7/2014 | Larimore et al. |
| 8,793,787 B2 | 7/2014 | Ismael et al. |
| 8,839,422 B2 | 9/2014 | Ghosh et al. |
| 8,856,782 B2 | 10/2014 | Ghosh et al. |
| 8,856,937 B1 | 10/2014 | Wuest et al. |
| 8,881,282 B1 | 11/2014 | Aziz et al. |
| 8,881,284 B1 | 11/2014 | Gabriel |
| 9,081,959 B2 | 7/2015 | Ghosh et al. |
| 9,098,698 B2 | 8/2015 | Ghosh et al. |
| 9,111,089 B1 | 8/2015 | Bhatia et al. |
| 9,117,075 B1 * | 8/2015 | Yeh ..................... G06F 21/56 |
| 9,436,822 B2 | 9/2016 | Ghosh et al. |
| 9,519,779 B2 | 12/2016 | Ghosh et al. |
| 9,602,524 B2 | 3/2017 | Ghosh et al. |
| 9,856,588 B2 | 1/2018 | Anneaux et al. |
| 10,043,001 B2 | 8/2018 | Ghosh et al. |
| 10,120,998 B2 | 11/2018 | Ghosh et al. |
| 10,187,417 B2 | 1/2019 | Ghosh et al. |
| 10,467,406 B2 | 11/2019 | Ghosh et al. |
| 10,567,414 B2 | 2/2020 | Ghosh et al. |
| 2002/0004799 A1 | 1/2002 | Gorelik et al. |
| 2002/0013802 A1 | 1/2002 | Mod et al. |
| 2002/0138701 A1 | 9/2002 | Suzuoki et al. |
| 2002/0169987 A1 | 11/2002 | Meushaw et al. |
| 2003/0023895 A1 | 1/2003 | Sinha et al. |
| 2004/0008652 A1 | 1/2004 | Tanzella et al. |
| 2004/0025158 A1 | 2/2004 | Traut |
| 2004/0064735 A1 | 4/2004 | Frazier et al. |
| 2004/0093372 A1 | 5/2004 | Chen et al. |
| 2004/0123117 A1 | 6/2004 | Berger |
| 2005/0086500 A1 | 4/2005 | Albornoz |
| 2005/0138370 A1 | 6/2005 | Goud et al. |
| 2005/0160133 A1 | 7/2005 | Greenlee et al. |
| 2005/0267856 A1 | 12/2005 | Woollen et al. |
| 2006/0021029 A1 | 1/2006 | Brickell et al. |
| 2006/0021031 A1 | 1/2006 | Leahy et al. |
| 2006/0136720 A1 | 6/2006 | Armstrong et al. |
| 2006/0168156 A1 | 7/2006 | Bae et al. |
| 2006/0195899 A1 | 8/2006 | Ben-Shachar et al. |
| 2006/0206904 A1 | 9/2006 | Watkins et al. |
| 2006/0271661 A1 | 11/2006 | Qi et al. |
| 2006/0277433 A1 | 12/2006 | Largman et al. |
| 2006/0294519 A1 | 12/2006 | Hattori et al. |
| 2007/0044151 A1 | 2/2007 | Whitmore |
| 2007/0079307 A1 | 4/2007 | Dhawan et al. |
| 2007/0106993 A1 | 5/2007 | Largman et al. |
| 2007/0107058 A1 | 5/2007 | Schuba et al. |
| 2007/0157312 A1 | 7/2007 | Joubert et al. |
| 2007/0174915 A1 | 7/2007 | Gribble et al. |
| 2007/0192866 A1 | 8/2007 | Sago et al. |
| 2007/0208822 A1 | 9/2007 | Wang |
| 2007/0226773 A1 | 9/2007 | Pouliot |
| 2007/0240212 A1 | 10/2007 | Matalytski |
| 2007/0250833 A1 | 10/2007 | Araujo, Jr. et al. |
| 2007/0250928 A1 | 10/2007 | Boney |
| 2007/0271610 A1 | 11/2007 | Grobman |
| 2007/0289019 A1 | 12/2007 | Lowrey |
| 2008/0010683 A1 | 1/2008 | Baddour et al. |
| 2008/0016339 A1 | 1/2008 | Shukla |
| 2008/0016568 A1 * | 1/2008 | Szor ..................... G06F 21/564 726/22 |
| 2008/0059556 A1 | 3/2008 | Greenspan et al. |
| 2008/0082976 A1 | 4/2008 | Steinwagner et al. |
| 2008/0098465 A1 | 4/2008 | Ramakrishna |
| 2008/0127292 A1 | 5/2008 | Cooper et al. |
| 2008/0127348 A1 | 5/2008 | Largman et al. |
| 2008/0141266 A1 | 6/2008 | Hunt et al. |
| 2008/0175246 A1 | 7/2008 | Kunhappan et al. |
| 2008/0215852 A1 | 9/2008 | Largman et al. |
| 2008/0235764 A1 | 9/2008 | Cohen et al. |
| 2008/0244743 A1 | 10/2008 | Largman et al. |

(56) References Cited

U.S. PATENT DOCUMENTS

| | | | |
|---|---|---|---|
| 2008/0244747 | A1 | 10/2008 | Gleichauf et al. |
| 2008/0271019 | A1 | 10/2008 | Stratton et al. |
| 2008/0271025 | A1 | 10/2008 | Gross et al. |
| 2008/0320594 | A1 | 12/2008 | Jiang |
| 2009/0025009 | A1 | 1/2009 | Brunswig et al. |
| 2009/0034423 | A1* | 2/2009 | Coon .............. H04L 69/163 370/244 |
| 2009/0044265 | A1 | 2/2009 | Ghosh et al. |
| 2009/0055693 | A1 | 2/2009 | Budko et al. |
| 2009/0113423 | A1 | 4/2009 | Hiltgen et al. |
| 2009/0125902 | A1 | 5/2009 | Ghosh et al. |
| 2009/0125974 | A1 | 5/2009 | Zhang et al. |
| 2009/0158430 | A1* | 6/2009 | Borders .............. H04L 63/1408 726/23 |
| 2009/0158432 | A1 | 6/2009 | Zheng et al. |
| 2009/0172662 | A1 | 7/2009 | Liu |
| 2009/0241190 | A1 | 9/2009 | Todd et al. |
| 2009/0254572 | A1 | 10/2009 | Redlich et al. |
| 2009/0282477 | A1 | 11/2009 | Chen et al. |
| 2009/0300599 | A1 | 12/2009 | Piotrowski |
| 2009/0300739 | A1 | 12/2009 | Nice et al. |
| 2009/0328008 | A1 | 12/2009 | Mital et al. |
| 2010/0005531 | A1 | 1/2010 | Largman et al. |
| 2010/0037235 | A1 | 2/2010 | Larimore et al. |
| 2010/0064039 | A9 | 3/2010 | Ginter et al. |
| 2010/0115621 | A1 | 5/2010 | Staniford et al. |
| 2010/0122342 | A1 | 5/2010 | El-Moussa et al. |
| 2010/0122343 | A1 | 5/2010 | Ghosh et al. |
| 2010/0125903 | A1 | 5/2010 | Devarajan et al. |
| 2010/0132011 | A1 | 5/2010 | Morris et al. |
| 2010/0138639 | A1 | 6/2010 | Shah et al. |
| 2010/0146523 | A1 | 6/2010 | Brigaut et al. |
| 2010/0192011 | A1 | 7/2010 | Largman et al. |
| 2010/0223613 | A1 | 9/2010 | Schneider |
| 2010/0235830 | A1 | 9/2010 | Shukla et al. |
| 2010/0306850 | A1* | 12/2010 | Barile .............. G06F 21/566 726/25 |
| 2010/0325357 | A1 | 12/2010 | Reddy et al. |
| 2011/0004749 | A1 | 1/2011 | Bennetts et al. |
| 2011/0047620 | A1 | 2/2011 | Mahaffey et al. |
| 2011/0083180 | A1 | 4/2011 | Mashevsky et al. |
| 2011/0099620 | A1 | 4/2011 | Stavrou et al. |
| 2011/0145923 | A1 | 6/2011 | Largman et al. |
| 2011/0167492 | A1 | 7/2011 | Ghosh et al. |
| 2011/0191851 | A1 | 8/2011 | Largman et al. |
| 2012/0297457 | A1 | 11/2012 | Schulte et al. |
| 2012/0304244 | A1* | 11/2012 | Xie .............. G06F 21/53 726/1 |
| 2012/0317645 | A1* | 12/2012 | Fortier .............. G06F 21/562 726/24 |
| 2012/0331553 | A1* | 12/2012 | Aziz .............. G06F 21/554 726/23 |
| 2013/0117006 | A1 | 5/2013 | Varghese et al. |
| 2013/0145463 | A1 | 6/2013 | Ghosh et al. |
| 2015/0212842 | A1 | 7/2015 | Ghosh et al. |
| 2015/0324586 | A1 | 11/2015 | Ghosh et al. |
| 2017/0200004 | A1 | 7/2017 | Ghosh et al. |
| 2017/0206348 | A1 | 7/2017 | Ghosh et al. |
| 2017/0302692 | A1 | 10/2017 | Ghosh et al. |
| 2018/0046479 | A1 | 2/2018 | Ghosh et al. |
| 2018/0103053 | A1 | 4/2018 | Ghosh et al. |
| 2018/0314823 | A1 | 11/2018 | Ghosh et al. |
| 2019/0158523 | A1 | 5/2019 | Ghosh et al. |
| 2020/0267173 | A1 | 8/2020 | Ghosh et al. |

FOREIGN PATENT DOCUMENTS

| | | |
|---|---|---|
| WO | WO 2005/074433 | 8/2005 |
| WO | WO 2005/074434 | 8/2005 |
| WO | WO 2005/116804 | 12/2005 |
| WO | WO 2007/048062 | 4/2007 |
| WO | WO 2008/027563 | 3/2008 |
| WO | WO 2008/027564 | 3/2008 |
| WO | WO 2008/092031 | 7/2008 |

OTHER PUBLICATIONS

Office Action for U.S. Appl. No. 13/690,452, dated Jun. 12, 2014, 16 pages.
Office Action for U.S. Appl. No. 13/690,452, dated Jan. 30, 2015, 21 pages.
International Search Report and Written Opinion for International Application No. PCT/US2012/067311, dated Mar. 12, 2013, 7 pages.
Office Action for U.S. Appl. No. 14/797,847, dated Nov. 23, 2015, 22 pages.
Office Action for U.S. Appl. No. 14/797,847, dated May 17, 2016, 31 pages.
Office Action for U.S. Appl. No. 15/359,004, dated Jul. 11, 2017, 27 pages.
Office Action for U.S. Appl. No. 12/558,841, dated Apr. 3, 2012.
Office Action for U.S. Appl. No. 12/558,841, dated Jan. 30, 2013.
Office Action for U.S. Appl. No. 12/558,841, dated Jan. 9, 2014.
Office Action for U.S. Appl. No. 12/558,841, dated Sep. 30, 2014.
Office Action for U.S. Appl. No. 14/808,681, dated Jun. 15, 2016.
Office Action for U.S. Appl. No. 15/841,913, dated Mar. 14, 2018, 9 pages.
Office Action for U.S. Appl. No. 12/037,412, dated Aug. 16, 2013.
Final Office Action for U.S. Appl. No. 12/037,412, dated Apr. 23, 2012.
Office Action for U.S. Appl. No. 12/037,412, dated Oct. 27, 2011.
Office Action for U.S. Appl. No. 14/482,786, dated Oct. 25, 2016, 16 pages.
Office Action for U.S. Appl. No. 14/482,786, dated Jan. 21, 2016, 20 pages.
Office Action for U.S. Appl. No. 14/482,786, dated Mar. 9, 2017, 14 pages.
Office Action for U.S. Appl. No. 12/059,454, dated Feb. 2, 2011.
Office Action for U.S. Appl. No. 12/059,454, dated Oct. 12, 2011.
Office Action for U.S. Appl. No. 12/757,675, dated May 15, 2013.
Office Action for U.S. Appl. No. 12/757,675, dated Aug. 2, 2012.
Office Action for U.S. Appl. No. 12/827,203, dated Jan. 15, 2013.
Office Action for U.S. Appl. No. 12/827,203, dated Apr. 17, 2014.
Notice of Allowance for U.S. Appl. No. 14/480,657, dated Apr. 25, 2016, 10 pages.
Office Action for U.S. Appl. No. 14/480,657, dated Sep. 21, 2015, 24 pages.
Office Action for U.S. Appl. No. 15/249,975, dated Jul. 28, 2017, 13 pages.
Office Action for U.S. Appl. No. 15/249,975, dated Dec. 4, 2017, 14 pages.
Office Action for U.S. Appl. No. 13/296,319, dated Sep. 5, 2013, 10 pages.
Office Action for U.S. Appl. No. 13/296,319, dated Dec. 17, 2012, 9 pages.
Notice of Allowance for U.S. Appl. No. 15/249,975, dated Jul. 3, 2018, 10 pages.
Office Action for U.S. Appl. No. 16/018,720, dated Feb. 26, 2019, 8 pages.
Office Action for U.S. Appl. No. 16/250,006, dated Jun. 26, 2019, 9 pages.
Notice of Allowance for U.S. Appl. No. 16/018,720, dated Jun. 27, 2019, 9 pages.
Notice of Allowance for U.S. Appl. No. 16/250,006, dated Oct. 2, 2019, 10 pages.
Office Action for U.S. Appl. No. 15/795,977, dated Oct. 4, 2019, 36 pages.
Adabala et al, From virtualized resources to vritual computing grids: the In-VIGO system. [online] (Nov. 11, 2003), Elsevier, pp. 1-14. Retrieved from the Internet: <http://users.cis.fiu.edu/-zhaom/research/fgcs.pdf>.
Arbaugh et al., Automated Recovery in a Secure Bootstrap Process, University of Pennsylvania, Distributed Systems Laboratory, Aug. 1, 1997.
Hines, M.. "'Virtual sandboxing' provides safe security testing," Computerworld [online], Retrieved from the Internet: Apr. 7, 2011, URL: http://www.computerworld.com/s/article/9029885/Virtual_Sandboxing_ . . . >, Aug. 9, 2007, 3 pages.

(56) References Cited

OTHER PUBLICATIONS

Huang, Y. et al., Efficiently tracking application interactions using lightweight virtualization, ACM, Oct. 31, 2008, 9 pages.
Liu, P. et al., Intrusion Confinement by Isolation in Information Systems, Department of Information Systems, University of Maryland, Baltimore County, The MITRE Corporation, Center for Secure Information Systems, and Department of Information and Software Engineering George Mason University, vol. 43, The International Federation for Information Processing (IFIP), pp. 3-18, Jul. 25-28, 1999.
Morales et al., "Building malware infection trees," Malicious and unwanted Software (Malware), Oct. 2011, 6th International Conference on (pp. 50-57), IEEE 2011.
Moshchuk, A. et al., "SpyProxy: Execution-based Detection of Malicious Web Content," Proceedings of 16th USENIX Security Symposium on USENIX Security Symposium, Aug. 6-10, 2007, 16 pages.
Peterson et al., "A Flexible Containment Mechanism for Executing Untrusted Code," [online] (2002). University of California, pp. 207-225. Retrieved from the Internet: <http://mse.uk.distfiles.macports.org/sites/ftp.wiretapped.net/pub/security/development/secure-programming/peterson-et-al-2002-a-flexible-containment-mechanism-for-executing-untrusted>.
Royal et al., "PolyUnpack: Automating the Hidden-Code Extraction of Unpack-Executing Malware". Computer Security Application Conference, 2006. ACSAC '06. 22nd Annual [online], Dec. 2006 [retrieved Apr. 4, 2014], Retrieved from the internet:<URL: http://ieeexplore.ieee.org/stamp/stamp.jsp?tp=&arnumber=4041175>.
Sapuntzakis, C. et al., "Virtual Appliances for Deploying and Maintaining Software," [online] (2003), ACM, Retrieved from the Internet <URL: http://dl.acm.org/citation.cfm?id=1051965>, 15 pages.
Seifert et al., Capture-HPC, About Capture Honeypot/Honeyclient, Sep. 22, 2008, Victoria University of Wellington, New Zealand.
Sekar, R. et al., A Specification-Based Approach for Building Survivable Systems, $21^{st}$ National Information Systems Security Conference, Oct. 1998.
Ugurlu, "Stealth Sandbox Analysis of Malware," PhD Thesis, Bilkent University (Ankara, Turkey) [online], Published Aug. 2009 [retrieved on Feb. 7, 2013] Retrieved from the Internet <URL:http://www.thesis.bilkent.edu.tr/0003921.pdf>.
Wang et al., Web Canary: A Virtualized Web Browser to Support Large-Scale Silent Collaboration in Detecting Malicious Web Sites (Web Canary), Nov. 15, 2008.
Wang, J. et al., "SafeFox: a Safe Lightweight Virtual Browsing Environment", Proceedings of the $43^{rd}$ Hawaii International Conference on System Sciences, 2010, 10 pages.
Jiang, X. et al., "Stealthy Malware Detection Through VMM-Based "Out-of-the-Box" Semantic View Reconstruction." CCS'07, Oct. 29-Nov. 2, 2007. Alexandria, Virginia USA, Proceedings of the 14th ACM Conference 2007, pp. 128-138.
King, S. T. et al. "SubVirt: Implementing malware with virtual machines," 2006, Proceedings of the 2006 IEEE Symposium on Security and Privacy (S&P'06), 14 pages.
Dinaburg, A. et al., "Ether: Malware analysis via hardware virtualization extensions," CCS'08, Oct. 27-31, 2008; Alexandria, Virginia, USA, 15th ACM Conference 2008. pp. 51-62.
Capture Communication Protocol, Sep. 22, 2007, Victoria University of Wellington, New Zealand.
Capture-HPC Client Honeypot/Honeyclient, Sep. 2, 2008, Victoria University of Wellington, New Zealand.
Know you Enemy: Malicious Web Servers, Aug. 9, 2007, http://www.honeypot.org.
Chiueh, T. et al., Spout: a transparent distributed execution engine for Java applets, Computer Science Department, State University of New York at Stony Brook, [online], Retrieved from the Internet: <http://www.ecsl.cs.sunyb.edu/spout.html>, Apr. 2000.
Jajodia, S. et al., Application-Level Isolation to Cope With Malicious Database Users, The MITRE Corporation, Center for Secure Information Systems, and Department of Information and Software Engineering George Mason University, Dec. 1998.
Malkhi, D. et al., Secure Execution of Java Applets using a Remote Playground, AT&T Labs Research, IEEE Transactions on Software Engineering, vol. 26, Issue 12, Dec. 2000, pp. 1197-1209.
Software for the Secure Management and deployment of Java, Digitivity, Inc., Aug. 6, 1998, http://www.digitivity.com/html/body_products.html.
Dehni, T. et al., Intelligent Networks and the HP OpenCall Technology, Aug. 1997, Article 6, Hewlett-Packard Journal, pp. 1-14.
Bressoud, T. C., TFT: A Software System for Application-Transparent Fault Tolerance, Twenty-Eight Annual International Symposium on Fault-Tolerant Computing, 1998.
Bressoud, T. C. et al., Hypervisor-Based Fault-Tolerance, ACM Transactions on Computer Systems, vol. 14, No. 1, Feb. 1996, pp. 80-107.
Jonback, et al., Open architecture in the Core of AXE, Ericsson Review No. 1, 2001.
Solstice DiskSuite 4.2.1 Reference Guide, Sun Microsystems, Inc., Feb. 2000.
Lee, J-S et al., A Generic Virus Detection Agent on the Internet, Proceedings of the Thirtieth Annual Hawaii International Conference on System Sciences 1997.
Czajkowski, G., Application Isolation in the Java Virtual Machine, Sun Microsystems Laboratories, Proceedings of the 15th ACM SIGPLAN conference on Object-oriented programming, systems, languages, and applications vol. 35. Issue 10, Oct. 2000, pp. 354-366.
Zeltser, L., Reverse Engineering Malware, May 2001.
The Symantec Enterprise Papers, Understanding and Managing Polymorphic Viruses, vol. XXX, copyright 1996.
Sugerman, J. et al., Virtualizing I/O Devices on VMware Workstation's Hosted Virtual Machine Monitor, Proceedings of the 2001 USENIX Annual Technical Conference, Jun. 2001.
Sapuntzakis, C. et al., "Virtual Appliances for Deploying and Maintaining Software", Computer Systems Laboratory, Stanford University, Oct. 2003.
JMunro, Virtual Machines & VMware, Part 1, Dec. 21, 2001, [online], Retrieved from the Internet: <http://www.extremetech.com/computing/72186-virtual-machines-vmware-part-i>.
JMunro, Virtual Machines & VMware, Part II, Dec. 28, 2001, [online], Retrieved from the Internet: <http://www.extremetech.com/computing/72268-virtual-machines-vmware-part-ii>.
Fritzinger, J. S. et al., Java Security, Sun Microsystems, Inc. 1996.
U.S. Appl. No. 61/221,749, filed Jun. 30, 2009.
CollaborateComm 2008 [online], Retrieved from the Internet: <http://collaboratecom.org/2008/program.php>, Orlando, FL, Nov. 2008.
CollaborateComm 2008 Selected Publications Table of Contents, Nov. 2008.
CollaborateComm 2008 Registration Policy, Orlando, FL, Nov. 13-16, 2008, 3 pages.
Timeline-Capture HPC, Nov. 13, 2008, [online], Retrieved from the Internet: <https://projects.honeynet.org/capture-hpc/timeline?from=20081113T21%3A15%3A49Z&precision=second>, 2 pages.
Timeline Capture HPC, Apr. 15, 2008, 4 pages, [online], Retrieved from the Internet: <https://projects.honeynet.org/capturehpc/timeline?from=20080415T13%3A53%3A08Z&precision=second>.
WikiStart (history) Capture-HPC, [online], Retrieved from the Internet: <https://projects.honeynet.org/capture-hpc/wiki/WikiStart?action=history>, Nov. 20, 2015.
Microsoft [online], Microsoft Windows XP—Shutdown, Retrieved from the Internet: https://www.microsoft.com/resources/documentation/windows/xp/all/proddocs/enus/shutdown.mspx?mfr=true. Feb. 23, 2016.
*Vir2us, Inc.* v. *Invincea, Inc. and Invincea Labs, LLC*—Civil Action No. 2:15-cv-00162HCM-LRL—Vir2us' Opening Claim Construction Brief—Document 48, Dec. 23, 2015, 31 pages.
*Vir2us, Inc.* v. *Invincea, Inc. and Invincea Labs, LLC*—Civil Action No. 2:15-cv-00162HCM-LRL—Krein Decl in Support—Document 50, Dec. 23, 2015, 18 pages.
*Vir2us, Inc.* v. *Invincea. Inc. and Invincea Labs, LLC*—Civil Action No. 2:15-cv-00162HCM-LRL—Invincea's Opening Claim Construction Brief—Document 51, Dec. 23, 2015, 31 pages.

(56) References Cited

OTHER PUBLICATIONS

*Vir2us, Inc.* v. *Invincea, Inc. and Invincea Labs, LLC*—Civil Action No. 2:15-cv-00162HCM-LRL—Decl of Rubin in Support of Invincea's Opening Claim Construction Brief—Document 52, Dec. 23, 2015, 34 pages.
*Vir2us, Inc.* v. *Invincea, Inc. and Invincea Labs, LLC*—Civil Action No. 2:15-cv-00162HCM-LRL—Invincea's Responsive Claim Construction Brief—Document 57, Jan. 11, 2016, 31 pages.
*Vir2us, Inc.* v. *Invincea, Inc. and Invincea Labs, LLC*—Civil Action No. 2:15-cv-00162HCM-LRL—Supp Decl of Rubin in Support of Invincea's Responsive Claim Construction Brief—Document 57-1, Jan. 11, 2016, 13 pages.
*Vir2us, Inc.* v. *Invincea, Inc. and Invincea Labs, LLC*—Civil Action No. 2:15-cv-00162HCM-LRL—Vir2us' Responsive Claim Construction Brief—Document 58, Jan. 11, 2016, 31 pages.
*Vir2us, Inc.* v. *Invincea, Inc. and Invincea Labs, LLC*—Civil Action No. 2:15-cv-00162HCM-LRL—Rebuttal Declaration of Krein in Support of Vir2us' Responsive Claim Construction Brief—Document 59, Jan. 11, 2016, 18 pages.
*Vir2us, Inc.* v. *Invincea, Inc. and Invincea Labs, LLC*—Civil Action No. 2:15-cv-00162HCM-LRL—Exhibit 2—Joint Claim Construction and Prehearing Statement, Document 61-2, Jan. 18, 2016, 4 pages.
*Vir2us, Inc.* v. *Invincea, Inc. and Invincea Labs, LLC*—Civil Action No. 2:15-cv-00162HCM-LRL—Exhibit 3 Joint Claim Construction and Prehearing Statement - Document 61-3, Jan. 18, 2016, 9 pages.
*Vir2us, Inc.* v. *Invincea, Inc. and Invincea Labs, LLC*—Civil Action No. 2:15-cv-00162HCM-LRL—Claim Construction Memorandum and Order, Document 69, Feb. 5, 2016, 16 pages.
*Vir2us, Inc.* v. *Invincea, Inc. and Invincea Labs, LLC*—Civil Action No. 2:15-cv-00162HCM-LRL—Vir2us Preliminary Invalidity Contentions, Exhibits, and Supporting Documents, Nov. 23, 2015.
Xia, et al., "Secure Semantic Expansion based Search over Encrypted Cloud Data supporting Similarity Ranking", Journal of Cloud Computing: Advances, Systems and Applications (2014); 3: 8, pp. 1-11.
Office Action for U.S. Appl. No. 15/795,977, dated May 29, 2019, 39 pages.
Notice of Allowance for U.S. Appl. No. 15/795,977, dated Nov. 16, 2020, 9 pages.

* cited by examiner

METHODS AND APPARATUS FOR CONTROL AND DETECTION OF MALICIOUS CONTENT USING A SANDBOX ENVIRONMENT

CROSS-REFERENCE TO RELATED APPLICATIONS

This application is a continuation of U.S. patent application Ser. No. 16/018,720, entitled "Methods and Apparatus for Control and Detection of Malicious Content Using a Sandbox Environment," filed Jun. 26, 2018, now U.S. Pat. No. 10,467,406, which is a continuation of U.S. patent application Ser. No. 15/359,004, entitled "Methods and Apparatus for Control and Detection of Malicious Content Using a Sandbox Environment," filed Nov. 22, 2016, now U.S. Pat. No. 10,043,001, which is a continuation of U.S. patent application Ser. No. 14/797,847, entitled "Methods and Apparatus for Control and Detection of Malicious Content Using a Sandbox Environment," filed Jul. 13, 2015, now U.S. Pat. No. 9,519,779, which is a continuation of U.S. patent application Ser. No. 13/690,452, entitled "Methods and Apparatus for Control and Detection of Malicious Content Using a Sandbox Environment," filed Nov. 30, 2012, now U.S. Pat. No. 9,081,959, which claims priority to and the benefit of U.S. Provisional Patent Application No. 61/566,162, filed Dec. 2, 2011 and entitled "Methods and Apparatus for Control and Detection of Malicious Content Using a Sandbox," each of which is incorporated herein by reference in its entirety.

BACKGROUND

Some embodiments described herein relate generally to a sandboxed protection system that protects a computing device from malicious content.

Information and application providers are continually challenged to deliver value and convenience to consumers by, for example, providing compelling information protection mechanisms. As the amount of the digitally available information increases, the amount of viruses and other malicious information or software (malware) that can harm computing devices and endanger information safety and security is also on the rise. Some known anti-virus software is used to prevent, detect and remove various types of malware. Some known anti-virus clients, however, for example, use signature-based detection methods, in which a computer is scanned for traces of known threats. Signatures can be developed based on examining known malware. Thus, threats previously unknown to anti-virus clients can go unnoticed and/or undetected.

Thus, it would be desirable to provide an alternative protection system, such as a sandbox that instead of using a signature-based detection paradigms, can detect malicious software based on, for example, software behavior.

SUMMARY

In some embodiments, a non-transitory processor-readable medium storing code represents instructions to cause a processor to receive a set of indications of allowed behavior associated with an application. The processor is also caused to initiate an instance of the application within a sandbox environment. The processor is further caused to receive, from a monitor module associated with the sandbox environment, a set of indications of actual behavior of the instance of the application in response to initiating the instance of the application within the sandbox environment. The processor is also caused to send an indication associated with an anomalous behavior if at least one indication from the set of indications of actual behavior does not correspond to an indication from the set of indications of allowed behavior.

DETAILED DESCRIPTION

Figure 1A:
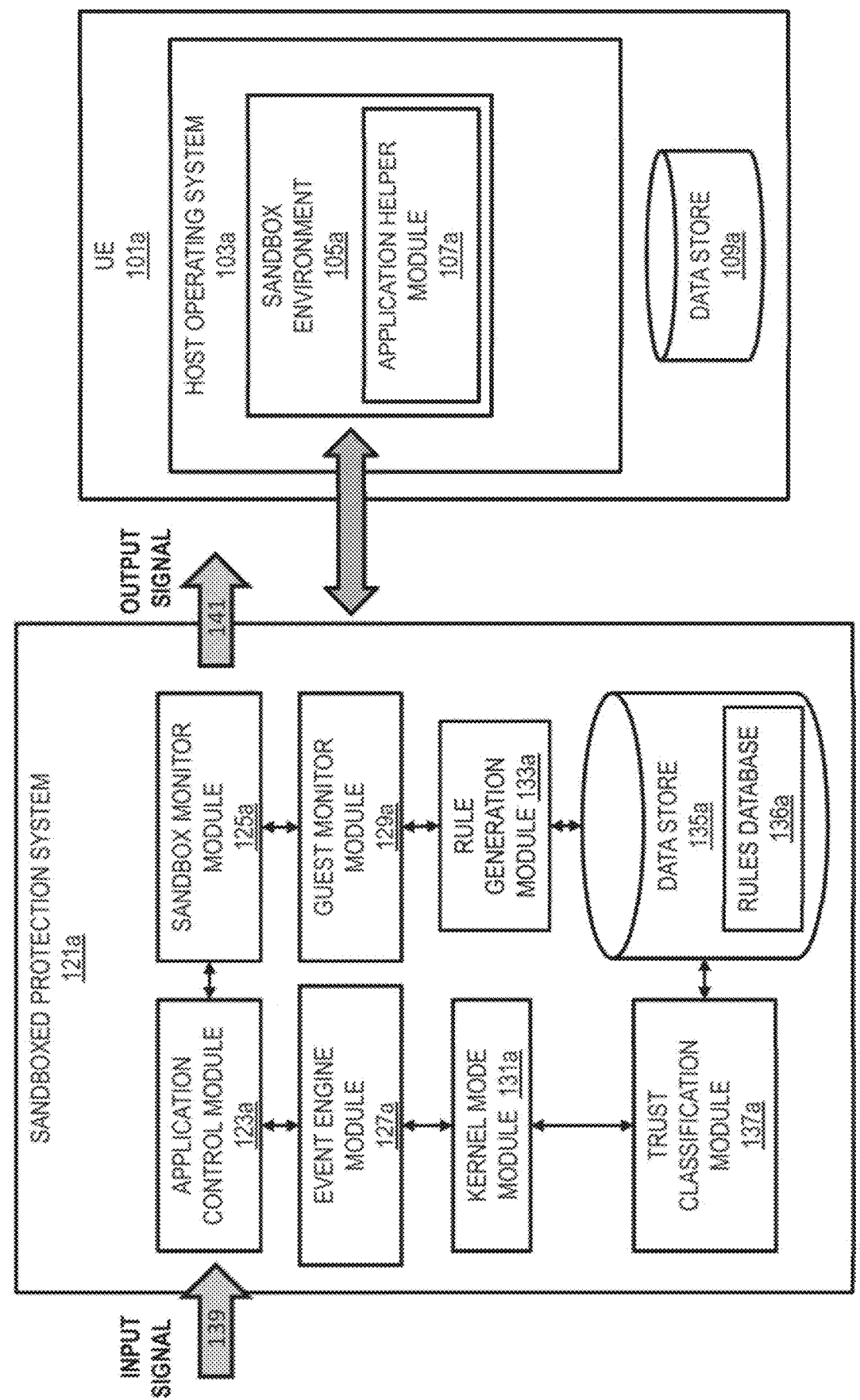
FIG. 1A is a schematic illustration of a sandboxed protection system, according to an embodiment.

Known anti-virus software is used to prevent, detect and remove various types of malware from computer devices. Some known anti-virus clients, however, use signature-based detection methods, in which a computer is scanned for traces of known threats. Signatures can be developed based on examining known malware. Thus, threats previously unknown to anti-virus clients can go unnoticed and/or undetected.

A sandbox can be used to separate and/or isolate running programs from each other. A sandbox can provide a controlled set of resources for use by suspicious programs. In some embodiments, a sandboxed protection system can detect malware in a way that overcomes shortcomings of the traditional anti-virus clients and network gateway products. In some embodiments, for example, the sandboxed protection system can use behavioral-based malware detection.

In some embodiments, behavior-based malware detection includes recognizing behaviors that software applications are allowed to perform. Behaviors not recognized can be considered suspect. For a typical user's computer, this can be an extraordinarily complex problem because the configuration is a dynamic operation. For example, over time, many applications can be installed and run on the computer. Many of these applications can access unsafe content on a network such as, for example, the Internet. In some embodiments, the sandboxed protection system can be designed to monitor processes and/or applications such as web browsers, document readers, etc. that are running in a sandbox environment. Such a sandbox environment can include applications installed by and/or recognized by the sandboxed protection system. In some embodiments, applications not installed by and/or recognized by the sandboxed protection system can be excluded from the sandbox environment. Thus, the sandboxed protection system can understand the behaviors of the applications running in the sandbox environment. In some embodiments, any behavior that falls outside of "normal behavior" (i.e., anomalous behavior) can be classified as a potential infection.

In some embodiments, after the sandboxed protection system detects anomalous behavior, the sandbox environment is no longer clean. The event that produced the anomalous behavior can be labeled as an infection. In some embodiments, the user can be informed of the infection and/or can be prompted to restore the sandbox to a clean state. Additionally, in some embodiments, the behaviors originating from the infection can be collected and/or organized into a forensic report. This forensic report can be provided to a separate data server when the user restores the sandbox to a clean state. In other embodiments, the forensic report can be stored locally instead of or in addition to providing the report to the separate data server. A system administrator can, based on the forensic report, view the forensic data. In some embodiments, the forensic data can describe and/or show in detail what happened during the infection session, where the infection came from, which portions of the sandbox environment were infected and/or which devices within a network were infected. In other embodiments, the forensic data can include a summary of the infections. In some embodiments, system administrators can view the full scope of infections that could have occurred on their network.

Apparatus, systems and methods are described herein to provide control and detection of malicious content using a sandbox environment. In some embodiments, a non-transitory processor-readable medium storing code representing instructions to cause a processor to perform a process includes code to cause the processor to receive a set of indications of allowed behavior associated with an application. The processor is also caused to initiate an instance of the application within a sandbox environment. The processor is further caused to receive, from a monitor module associated with the sandbox environment, a set of indications of actual behavior of the instance of the application in response to initiating the instance of the application within the sandbox environment. The processor is also caused to send an indication associated with an anomalous behavior if at least one indication from the set of indications of actual behavior does not correspond to an indication from the set of indications of allowed behavior.

In some embodiments, an apparatus includes a control module implemented in at least one of a memory or a processing device. The control module is configured to initiate an instance of a first application and an instance of a second application within a sandbox environment. The control module is also configured to receive, from a monitor module associated with the sandbox environment, a set of indications of actual behavior of the instance of the first application and a set of indications of actual behavior of the instance of the second application. An indication of a behavior is within both the set of indications of actual behavior of the instance of the first application and the set of indications of actual behavior of the instance of the second application. The control module is also configured to classify the behavior as an anomalous behavior for the first application based on a baseline behavior set for the first application. The control module is configured to not classify the behavior as an anomalous behavior for the second application based on a baseline behavior set for the second application. The control module is further configured to send a signal in response to classifying the behavior as an anomalous behavior for the first application.

In some embodiments, an apparatus includes a control module implemented in at least one of a memory or a processing device. The control module is configured to receive a set of indications of allowed behavior associated with a first application. The control module is configured to initiate an instance of the first application within a sandbox environment such that the instance of the first application initiates an instance of a second application within the sandbox environment. The control module is also configured to receive, from a monitor module associated with the sandbox environment, a set of indications of actual behavior of the instance of the second application in response to the instance of the first application initiating the instance of the second application. The control module is also configured to send an indication associated with an anomalous behavior if at least one indication from the set of indications of actual behavior of the instance of the second application does not correspond to an indication from the set of indications of allowed behavior associated with the first application.

As used herein, the singular forms "a," "an" and "the" include plural referents unless the context clearly dictates otherwise. Thus, for example, the term "a "sandbox environment" is intended to mean a single sandbox environment or a combination of sandbox environments (e.g., sandbox environments with a series of configurations for classes of applications, for applications with different levels of trust, etc.).

FIG. 1A is a schematic illustration of a sandboxed protection system, according to an embodiment. As shown in FIG. 1A, a sandboxed protection system 121*a* can be operatively coupled to at least one User Equipment (UE) 101*a*. A UE 101*a* can be a personal computer, a tablet computer, a mobile telephone, a smart telephone, a personal data assistant (PDA), etc. The UE 101*a* can include at least a sandbox environment 105*a* that operates under a host operating system 103 of the UE 101*a*. The UE 101*a* can further include a data store 109*a*. A data store can be, for example, a memory, a data storage device such as a hard drive, or any component or recording media used to retain digital data.

In some instances, the sandbox environment 105*a* can include an application helper module 107*a*. The application helper module 107*a* is an application extension or add-on that monitors activity within an application running on UE 101*a*. For example, an application helper module 107*a* can be used, under the supervision of the sandboxed protection system 121*a*, to monitor an identifier of a source of an anomalous behavior. For example, the application helper module 107*a* can monitor Uniform Resource Locators (URLs) accessed by a user of UE 101*a* using a browser application.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The sandboxed protection system 121*a* can provide a security mechanism for separating running programs associated with UE 101*a*. In some instances, a sandbox environment 105*a* can be used by UE 101*a* under control of the sandboxed protection system 121*a* to execute untested code, or untrusted programs from unverified third-parties, suppliers, untrusted users and untrusted websites. The sandboxed protection system 121*a* can provide a tightly-controlled set of resources in which guest programs can run, such as scratch space on a data store 109a. In some instances, the sandboxed protection system 121a can limit, disallow, or restrict capabilities of a UE 101a such as, for example, network access, ability to inspect a host system, read from input devices, etc.

As shown in FIG. 1A, a sandboxed protection system 121a can include an application control module 123a, a sandbox monitor module 125a, an event engine module 127a, a guest monitor module 129a, a kernel mode module 131, a rule generation module 133, a data store 135, and a trust classification module 137. Furthermore, the sandboxed protection system 121a communicates with one or more User Equipments (UEs) 101a or other devices, computer network systems, etc., via input signal 139 and output signal 141. Thus, FIG. 1A is merely an example illustrating the types of components that can be included within a sandboxed protection system 121a.

In various instances, the sandboxed protection system 121a and its components may be located anywhere within a communication network system (not shown in FIG. 1A) including, but not limited to, within the UE 101a, within one or more service provider devices (not shown), or in separate locations within the communication network system.

In some instances, the application control module 123a is configured to control the sandbox environment 105a by sending an output signal to the sandbox environment 105a via the output signal 141. For example, the application control module 123a can initiate a module within the UE 101a that is executed by the host operating system 103a using the sandbox environment 105a of UE 101a. The application control module 123a can initiate the sandbox environment 105a, for example by activating one or more applications and/or processes within the sandbox environment 105a. The application control module 123a can also terminate a sandbox environment 105a by terminating one or more applications and/or processes running within the sandbox environment 105a. The application control module 123a can also initialize or clean the sandbox environment 105a by, for example, restarting the sandbox environment 105a or restoring a standard or predefined set of configurations to the sandbox environment 105.

In some instances, the sandbox control module 123a is configured to initiate a module to run within the sandbox environment 105a to monitor application activity within the sandbox environment 105a. In some embodiments, the application helper module 107a can monitor activity within the sandbox environment 105a that the host operating system 103a is unable to monitor outside the sandbox environment 105a.

In some instances, the kernel mode module 131 can control a kernel mode of operation of software applications within the host operating system 103a. In some instances, in kernel mode operation, a process can have complete and unrestricted access to the underlying hardware of the UE 101a. In such instances, the kernel mode module 131 enables a running process to execute any Central Processing Unit (CPU) (not shown) instruction and/or reference any memory (not shown) address. In some instances, the kernel mode module 131 can reserve the kernel mode operation for lowest-level, most trusted functions of the host operating system 103a.

In some instances, the event engine module 127a can control a user mode of operation of software applications within the host operating system 103a. In some instances, in user mode operation, a process is unable to directly access hardware and/or reference memory of the UE 101a. In some instances, the event engine module 127a enables a process running in user mode to delegate requests to system Application Programming Interfaces (APIs) to access hardware or memory of the UE 101a. The protection provided by the user mode isolation, enables the host operating system 103a to recover crashes in user mode. In some instances, most of the processes and/or code associated with applications running on a UE 101a can be executed in user mode controlled by the event engine module 127a.

In some instances, the application control module 123a can activate the event engine module 127a. The event engine module 127a can be included within the application control module 123a. The event engine module 127a is a rule-based event processing engine that can determine if an event (e.g., a process, a service, etc.) is allowed to be executed on UE 101a or is an infection (e.g., a malware).

In some instances, the event engine module 127a can be responsible for receiving event data and analyzing the received data to determine if an anomalous behavior has occurred. In some instances, the event engine module 127a can receive data associated with events in substantially real-time.

In some instances, the sandboxed protection system 121a can substantially constantly and/or periodically detect anomalous behavior and/or collect data associated with the anomalous behavior from applications and/or processes in the sandbox environment 105a. In some instances, the collected data can be evaluated by the event engine module 127a using a script (e.g., a rule-based filter) and the associated processes can be added to a tree of processes and/or process behaviors referred to herein as an evaluation tree, stored in data store 109a or in data store 135. In some instances, the evaluation tree can be used by the event engine module 127a to keep track of and/or monitor the current state of the sandbox environment 105a. For example, if application App1 launches application App2, then App1 is defined as a node in the evaluation tree with App2 as its child. In some instances, behaviors associated with a potential infection are added to the evaluation tree and/or behaviors not associated to a potential infection are not added to the evaluation tree. In some instances, as more information is gathered about a node (e.g., an application) in the evaluation tree, new information can be associated with the node as an attribute. Upon occurrence of an anomalous behavior, the evaluation tree can be serialized to a forensic report. The forensic report can be stored in a data store 109a or a data store 135 as a record of an infected session.

In some instances, in order to effectively define what a sandboxed application, process and/or service is allowed to do, features of a product including the application and/or the process can be defined ahead of time, for example by the provider, or at run time, for example by the sandboxed protection system 121a, via regulated authorization. For example, a rule can be defined to identify behaviors of a sandboxed application, process and/or service that may trigger an infection. The rule can be used by the event engine module 127a to determine a behavior as allowed or not-allowed for the sandboxed application, process and/or service. In some instances, when defining allowable rules for file and registry events, techniques such as, for example, wild cards can be used as a shortcut to match a single rule to multiple files and/or folders. Thus, in such instances, a balance can be reached regarding how strict each rule should be. If too many events associated with a process are allowed, then a potential infection can be missed. However, if too many events are restricted, then a false positive can alert the user of UE 101a, in which an allowed behavior is detected as anomalous.

Additionally, in some instances, some system administrators can have the authority to pre-configure the sandboxed applications with their own software applications, processes and/or browser add-ons. In such instances, the system administrators can build and/or define a reliable set of rules that covers the allowed behaviors of the applications and/or processes and enters the rules into the sandboxed protection system 121a via input signal 139. The rules may be stored by the sandboxed protection system 121a in rules database 136a and accessed by the application control module 123a, event engine module 127a or other components of the sandboxed protection system 121a. In some instances, to handle these challenges, the sandboxed protection system 121a can associate levels of trust to the applications and/or processes being monitored in the sandbox environment 105a.

In some instances, the event engine module 127a can receive a notification from the sandbox monitor module 125a associated with a behavior of an instance of an application running within the sandbox environment 105a. For example, the event engine module 127a may receive a notification from the sandbox monitor module 125a indicating that an instance of a Web browser running within the sandbox environment 105a is trying to modify a system file. The event engine module 127a can receive a set of rules from the rules database 136a describing allowed behavior associated with the application. The set of rules may include rules describing file modification rights of the Web browser application. The event engine module 131 can analyze the set of rules and determine whether the system file modification by the Web browser is allowed. If the modification is allowed by the Web browser the event engine module 127a can send a signal to the application control module 123a that the modification attempt by the Web browser is an allowed behavior. The application control module 123a can, in response, allow the Web browser instance to continue execution and modify the system file. Otherwise, if the analysis results by the event engine module 127a indicate that the attempt by the Web browser to modify the file system is not allowed, the event engine module 127a indicates the system file modification as an anomalous behavior and sends the indication to the application control module 123a. The application control module 123a can, in response, terminate the file system modification attempt, terminate the Web browser, terminate the sandbox environment 105a, or take other predetermined actions associated with such anomalous behaviors. Furthermore, the event engine module 127a can store the anomalous behavior in the rules database 136a associated with the Web browser application.

In some instances, the trust classification module 137 can associate a trust level to each application, process and/or service that is executed within the sandbox environment 105a. The trust classification module 137 can also associate a set of trusted processes with each application, process and/or service. The trust level and/or the set of trusted processes may be defined at least based on past behavior of the application, process and/or service, user input, application, process and/or service type, type of data associated with UE 101a that the application, process and/or service attempts to access, etc. The trust classification module 137 can store the trust level and/or the set of trusted processes associated with each application, process and/or service at the rules database 136a.

In some instances, the sandbox monitor module 125a can monitor activities of an instance of an application within the sandbox environment 105a by tracing network activities of the running instance of the application within the sandbox environment 105a. The sandbox monitor module 125a can also monitor one or more executable files of the instance of the application.

In some instances, different levels of trust can be associated with applications and/or processes based on monitoring of the applications and/or processes by the sandbox monitor module 125a. For example, in some instances, an application, process and/or service can be classified as "trusted", "untrusted", "suspect", or "unknown". In some instances, such a classification can be performed by a trust classification module 137 of the sandboxed protection system 121a. In some instances, the rule author (e.g., a system administrator) can make a determination of whether an application, process and/or service in the sandbox environment 105a is trusted or untrusted. The sandboxed protection system 121a can then automatically assign trust levels suspect and unknown after further evaluation of the application, process and/or service. In other instances, the rule author can also make the determination of whether the application, process and/or service is suspect or unknown. In still other instances, the sandboxed protection system 121a can automatically assign a trust level to each application, process and/or service based on a type of the application, process and/or service (e.g., game, browser, word processor, etc.), observed behavior of the application, process and/or service, etc. In some instances, a system administrator can request the sandboxed protection system 121a to override a trust level for an application, process and/or service. Similarly, in some instances, a system administrator can request the sandboxed protection system 121a to modify the trust levels of applications and/or processes. Classifying the trustworthiness of each process in a guest application can provide flexibility for customization of the scope of malware detection.

In some instances, declaring a process as trusted in the rules, can essentially imply that any possible behavior exhibited and/or actions performed by the process and/or the process's child processes are considered as allowed behavior. In some instances, trusted processes can be allowed to perform any action. In such instances, by classifying a process as trusted, the sandboxed protection system 121a can effectively disable detection for that process. In such instances, for example, if a trusted process launches a child process, the child process can inherit the trust and become trusted. As another example, if a file is written by a trusted process and launched by a different process, the new process can be trusted because the file inherits the trust from the trusted process. This behavior can be common for programs that update themselves. In other instances, a system administrator can request the sandboxed protection system 121a for manual or rule-based reclassification of each child process launched and/or written by a trusted process.

Trusting a process is, typically, a less secure option than not trusting the process. Thus, in some instances the sandboxed protection system 121a can warn the system administrators about the risk of adding new software into the sandbox environment 105a. For example, a system administrator that would like to install a WebEx application, process and/or service in the sandbox environment 105a but would also like to avoid defining allowed behaviors for the WebEx process and all child processes can declare WebEx.exe as a trusted process. In some instances, a system administrator can declare a process as trusted by providing the path to the root process to a trusted process section of the rules stored in rules database 136a and processed by the event engine module 127a.

In some instances, processes that are monitored by the sandbox monitor module 125a as potential propagation methods for infection can be declared and/or classified as untrusted by the trust classification module 137. In some instances, if the event engine module 127a detects that an untrusted application, process and/or service performs a suspicious behavior that is not explicitly defined as allowed, this is a trigger for an infection. In some instances, the rules database 136a can include whitelisted rules for untrusted applications and/or processes that define normal trusted operating behaviors of the applications and/or processes.

For example, in a Microsoft Windows environment, a main account in the sandbox environment 105a can run and/or execute as a limited user. Therefore, some processes associated with the main account may not have permission to modify registry keys inside HKEY_LOCAL_MACHINE. If a process without having the permission attempts to modify a portion of the registry key, the sandboxed protection system 121a can recognize the attempted modification as a trigger behavior for an infection. A process P, however, which runs in the system context, can have permission to modify registry keys inside HKEY_LOCAL_MACHINE. In order to prevent process P from triggering an infection, a rule that allows P to access the registry key can be defined (as seen in the Heuristic Table shown below).

In some instances, after an infection has occurred, the process that caused the infection can be classified, by the sandboxed protection system 121a, as suspect. In some instances, after the process is classified as suspect, the sandboxed protection system 121a can record subsequent behaviors being performed by the process and/or its child processes. In some instances, similar to trusted processes, behavior originating from a suspect process can inherit the suspect trust level. After an event is evaluated as being suspect by the event engine module 127a, it can be added to the evaluation tree so that it can be serialized into a forensic report (e.g., a report file in data store 135). The forensic report can be analyzed by the event engine module 127a and can provide details of the suspect events.

In some instances, additional information on suspect behaviors and/or events associated with processes and applications such as, for example, cryptographic hash functions (e.g., Message Digest (MD5) hashes, Secure Hash Algorithm (SHA) hashes, etc.) providing unique signatures for files, can be captured by the sandboxed protection system 121a. After a hash value is calculated, it can be sent to the event engine module 127a to be attached as an attribute to the application and/or the process in the evaluation tree. The hash value can be used to lookup and/or compare the triggering application, process and/or service against a third-party malware (e.g., virus) database. This lookup can provide information about number of anti-virus clients that scanned the process as being infected.

In some instances, the sandboxed protection system 121a also includes a user-configurable feature which can terminate and/or kill any suspect processes as they are detected. In some instances, the process termination can be accomplished by terminating and/or killing a process as soon it is classified as suspect. In other instances, the sandboxed protection system 121a can provide information about the suspect processes to a system administrator and allow the administrator to terminate and/or kill a process.

In some instances, a process can be classified as unknown if its path is not explicitly listed as trusted or untrusted in the rules database 136a. In some instances, because this process has not yet been configured and/or classified, it can perform actions and/or behaviors without triggering an infection. In some instances, however, unlike trusted processes, the unknown trust of this process is not inherited across child processes. An unknown process can, for example, launch an application App 1, and application App 1 can be tracked as untrusted. In some instances, because unknown process behaviors are important to know about and evaluate, the behaviors of an unknown process can be added to the evaluation tree and can show up in an infection report (e.g., a forensic report) if the session becomes tainted. While four trust levels are shown and described herein, in other instances any number of trust levels can be used.

In some instances, designing the allowable behavior rules can depend on the types of behaviors that can trigger an infection. In some instances, for example, infections can be determined based on the following heuristics table. In various instances, other infection triggers can be added with additional sensors and/or types of events.

In some instances, when an infection is detected, an attempt can be made by the sandboxed protection system 121a to determine the originating source of the infection. For example, if the infection is triggered by a web browser (e.g., Internet Explorer, Firefox, etc.), or a child process of a web browser, then the source can be determined based on a URL history of a user of UE 101a. The URL trace events can be captured from an application helper module 107a attached to the web browser. The URL trace events can be fed to the event engine module 127a, which then correlates the main URL and any URLs redirected from that main URL with an infection. The event engine module 127a can correlate the URLs by tracing backwards in time from the most recent URL matching a Process Identifier (PID) associated with an infection root. For another example, a process, application, service and/or the like can be identified as the originating source of the infection.

In some instances, for example, the sandboxed protection system 121a can allow a user of UE 101a to launch a portable document format (PDF) file on the UE 101a for viewing inside the sandbox environment 105a. Since PDF readers are a prime attack propagation method for viruses, the sandboxed protection system 121a can trace the source to the PDF file if an infection is originated from the PDF reader or its child processes. The sandboxed protection system 121a can do this by keeping and/or maintaining a map of processes in the sandbox environment 105a that were launched when the PDF file was redirected from the host operating system 103a. When an infection occurs, the sandboxed protection system 121a can check the map to see if the PDF file belongs to an infected process. This technique can be used to track an infection if other redirected documents from the host operating system 103a are determined to be the source of an infection.

Heuristics Table

1. If an untrusted process launches another process that is not explicitly allowed,
2. If an untrusted process terminates another process that is not explicitly allowed,
3. If an untrusted process writes a file and the file is launched by a process with unknown trust,
4. If an untrusted process modifies a sensitive registry value that is not explicitly allowed, for example:
    a. HKEY_LOCAL_MACHINE
    b. HKEY_CLASSES_ROOT -continued Heuristics Table c. Any windows startup key
  d. Any policy key,
 5. If an untrusted process modifies a sensitive file path that is not explicitly allowed,
  Examples of restricted paths are:
   a. C:\Windows\System32
   b. C:\Program Files
 6. If an untrusted process deletes, renames, or overwrites an executable file,
 7. If an untrusted process makes a TCP/UCP connection that is not explicitly allowed,
 8. If an untrusted process set up a TCP/UDP listener that is not explicitly allowed.

After the source of an infection is determined, the source can be added as a node in the evaluation tree as a child of the infected process and/or application. This source can be included in the summary of infection report (e.g., the forensic report) provided to a system administrator by the sandboxed protection system 121a. In some instances, if no source for the infection is found, the name of the infected process can be used.

As previously discussed, rules can be defined and stored in the rules database 136a by users, by system administrators, by application providers, etc. A set of rules can be associated with each application, process and/or service. The set of rules associated with an application, process and/or service define allowed behavior of the application, process and/or service. In some instances, the rules associated with an application, process and/or service can be used by the event engine module 127a to determine whether a behavior triggers and/or is associated with an infection. The rules can be divided up into a plurality of rule sets, for example a main rule set (e.g., rules associated with the host operating system 103a), a custom rule set (e.g., rules associated with applications and/or processes), etc. In some instances, the main rule set can be provided with and/or standard to the sandboxed protection system 121a. In some instances, system administrators can introduce their own custom rule sets by entering rules into the sandboxed protection system 121a via input 139. In some instances, the applications executed in sandbox environment 105a (e.g., browsers) can be customizable for installing software. A custom rule set file can enable the event engine module 127a to define allowable behaviors for new processes that would otherwise trigger an infection. When the event engine module 127a is initialized, the main rule set can be merged with the custom rule sets and, for example, compiled into a byte code. The sets of rules may be stored in the rules database 136a.

In some instances, the sandboxed protection system 121a includes a rule generation module 133 that automatically generates rules for an application, process and/or service based on previously declared infections associated with same or similar applications and/or processes (e.g., applications with the same type). For example, the rules generation module 133 can generate rules based on infections that have been declared as false positives. The rule generation module 133 can also generate rules based on sets of rules existing in the rules database 136a for the application, process and/or service. The rule generation module 133 can address various issues associated with application, process and/or service behavioral detection. For example, the rule generation module 133 can define allowed behaviors for new applications. The rule generation module 133 can also provide a false positive infection report (e.g., forensic report) and convert the report into a new set of rules. The rule generation module 133 can further enable a system administrator to develop rules for their own set of plug-ins that have not been already declared and/or included in the main rule set.

In some instances, the sandboxed protection system 121a can include functionality to automatically generate allowed rules from an infection that may be a false positive. In some instances, for example, the system administrators can view the forensic report provided by the sandboxed protection system 121a and provide an indication to allow a process and/or behavior of a process. For example, the system administrator can click a button labeled "Allow . . . " next to the entry for a process and/or behavior of a process. In some instances, this button can enable the system administrator to add the process and/or behavior of the process to the main rule set (e.g., windows.rul) and/or a custom rule set (e.g., custom.rul). In some instances, a system administrator can provide an input to the sandboxed protection system 121a to trust new processes, for example by selecting a checkbox for "Trust newly encountered processes", the system administrator can automatically classify new processes as trusted, which, while less secure, can reduce the chance of false positives.

In some instances, when a user of a UE 101a generates custom rules, the forensic report, the main rule set, and/or the custom rule set (if exists) can be sent from UE 101a to the rule generation module 133 via input signal 139. The rule generation module 133 can receive the inputs and generate a new custom rule set, for example to be saved in rules database 136a. After the new custom rule set is generated, the sandboxed protection system 121a can send a signal to the UE 101a via output signal 141. In response to the signal, the UE 101a can provide an option to the user (e.g., a button) to display a save dialog that allows the user to retrieve the newly defined custom rule set from the rules database 136a.

Additionally, in some instances, the sandboxed protection system 121a can be set to a training mode. The training mode can be, for example, a command line parameter. In some instances, while the sandboxed protection system 121a is in training mode, infections sent to the UE 101a can be flagged by the event engine module 127a as training samples and distinguished visually (e.g., in a report and/or in the rule generation module 133) from real infections with an indicator such as a different color or special icon. This can help distinguish between actual infection reports and training samples that are used to generate rules by the rule generation module 133. In some instances, training samples can then be converted into additional rules automatically or via interaction with the system administrator. The events collected in the training sample can be filtered, reduced and/or output as new detection rules. The new rules can be downloaded and used by the event engine module 127a for future detection and/or analysis.

In some instances, for determining behavior of the processes executed in the sandbox environment 105a, multiple sensors (not shown) can be defined and/or set up on the UE 101a to capture events (e.g. anomalous behavior) and collect data about events. In some instances, the sensors can include module detection (e.g., process detection). In some instances, even though the sandboxed protection system 121a can classify a new process as trusted, false positives can still occur. For example, when writing rules for a WebEx plug-in, although WebEx is installed and webex.exe has been declared and/or classified as a trusted process, webex.dll is still loaded into a browser (e.g., Internet Explorer). Anything webex.dll does can show up as a behavior originating from the browser (e.g., iexplore.exe). Therefore, in order to fully whitelist WebEx, the sandboxed protection system 121a can whitelist suspicious behaviors for the browser that could otherwise be compromising. In order to solve this problem, the sandboxed protection system can understand what modules are doing irrespective of the process into which they are loaded.

Similarly stated, the sandboxed protection system can separate behaviors from modules and processes. Referring to the above example, the sandboxed protection system can declare, classify and/or recognize webex.dll as a trusted module. Anything webex.dll does can be allowed, however, the browser (e.g., iexplore.exe) can trigger an infection if it performs the same suspicious behavior. Similarly, in some embodiments, the sandboxed protection system can declare, classify and/or recognize webex.dll as untrusted but whitelist the behaviors originating from that module for added security.

In some instances, the guest monitor module 129a provides an operating system device driver that can monitor and/or report activity associated with a network, a file system, a registry and/or initiation and/or termination of processes within UE 101a.

The data collected by the sensors can be stored in data store 109a and sent to the event engine module 127a to be processed and analyzed based on a previously defined list of allowed behavior for the processes.

In some instances, the events can be captured in substantially real-time. For example, events can be captured using a kernel driver that hooks onto and/or monitors process events, file events, registry events, and/or network events as the events are being performed. In some instances, for example, the application helper module 107a can be loaded in a web browser (e.g., Internet Explorer or Firefox) to capture Uniform Resource Locator (URL) events. These captured events can be sent to the event engine module 127a for analysis. The event engine module 127a can process each event by running it through a rule-based filter. In some instances, the rules for the rule-based filter can be defined using a scripting language optimized to filter events efficiently. As shown in FIG. 1A, the host operating system 103a executes a sandbox environment 105a controlled by a sandboxed protection system 121a.

In some instances, the sandboxed protection system 121a can be activated by instructions stored in a memory (e.g., a non-transitory processor-readable medium 113) on the UE 101a. Additionally, in some instances, the sandboxed protection system 121a can include additional modules and/or engines such as, for example, a trust classification module, a rule engine, a detection engine, and/or the like (each not shown). Such modules and/or engines can be hardware modules and/or engines, or software modules and/or engines executing in hardware.

Figure 1B:
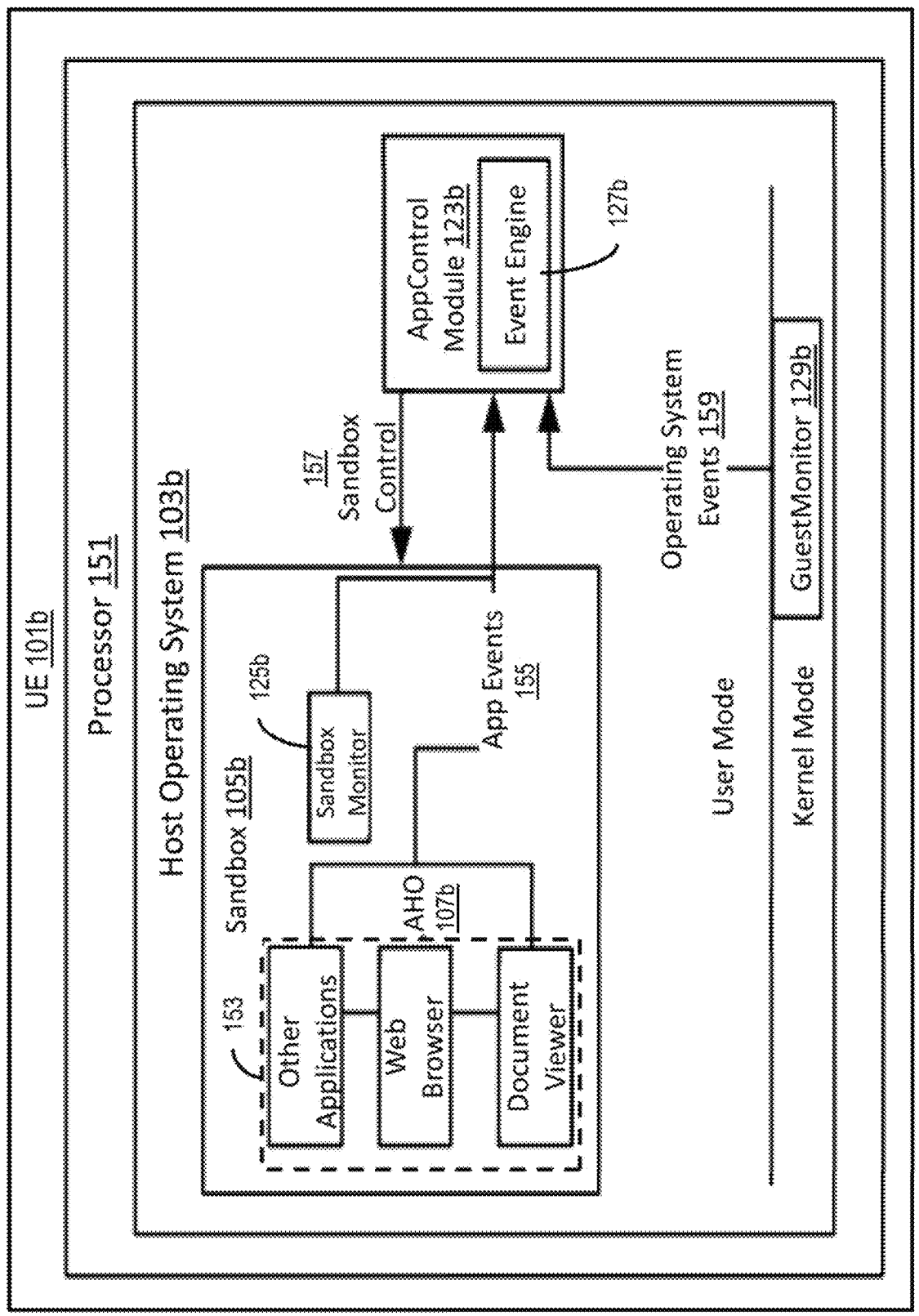
FIG. 1B is a schematic illustrations of a sandbox environment within a user device, according to an embodiment.

FIG. 1B is a schematic illustrations of a sandbox environment 105b within a UE 101b. In FIG. 1B components 101b, 103b, 105b, 107b, 123ab, 125b, 127b, and 129b are structurally and/or functionally similar to components 101a, 103a, 105a, 107a, 123a, 125a, 127a, and 129a of FIG. 1A, respectively. In the instance shown in FIG. 1B, the application control module 123b can execute within the host operating system 103b, the event engine module 127b can execute within the application control module 123b, and the sandbox monitor module 125b can execute within the sandbox environment 105b. In other embodiments, the sandbox monitor module 125b can execute on the host operating system 103b but outside the sandbox environment 105b.

In some instances, applications 153 such as web browsers, documents viewers, etc. are executed within the sandbox environment 105b. The sandbox monitor module 125b and the application helper module 107b report application events (e.g., application behaviors) 155 associated with applications 153 to the application control module 123b. The application control module 123b can control the sandbox environment 105b (shown as arrow 157), for example by initiating, terminating, or modifying applications and/or processes executed within the sandbox environment 105b using the application events 155. Furthermore, the guest monitor module 129b reports kernel mode events such as events associated with the host operating system 103b to the application control module 123b (shown as arrow 159). In some instances, the application control module 123b and/or the event engine module 127b can use the operating system events 159 for controlling the applications 153 within the sandbox environment 105b.

Examples of the processes by sandboxed protection system 121a are further described below in connection with flowcharts of FIG. 3, FIG. 4, FIG. 5, and FIG. 6.

Figure 2:
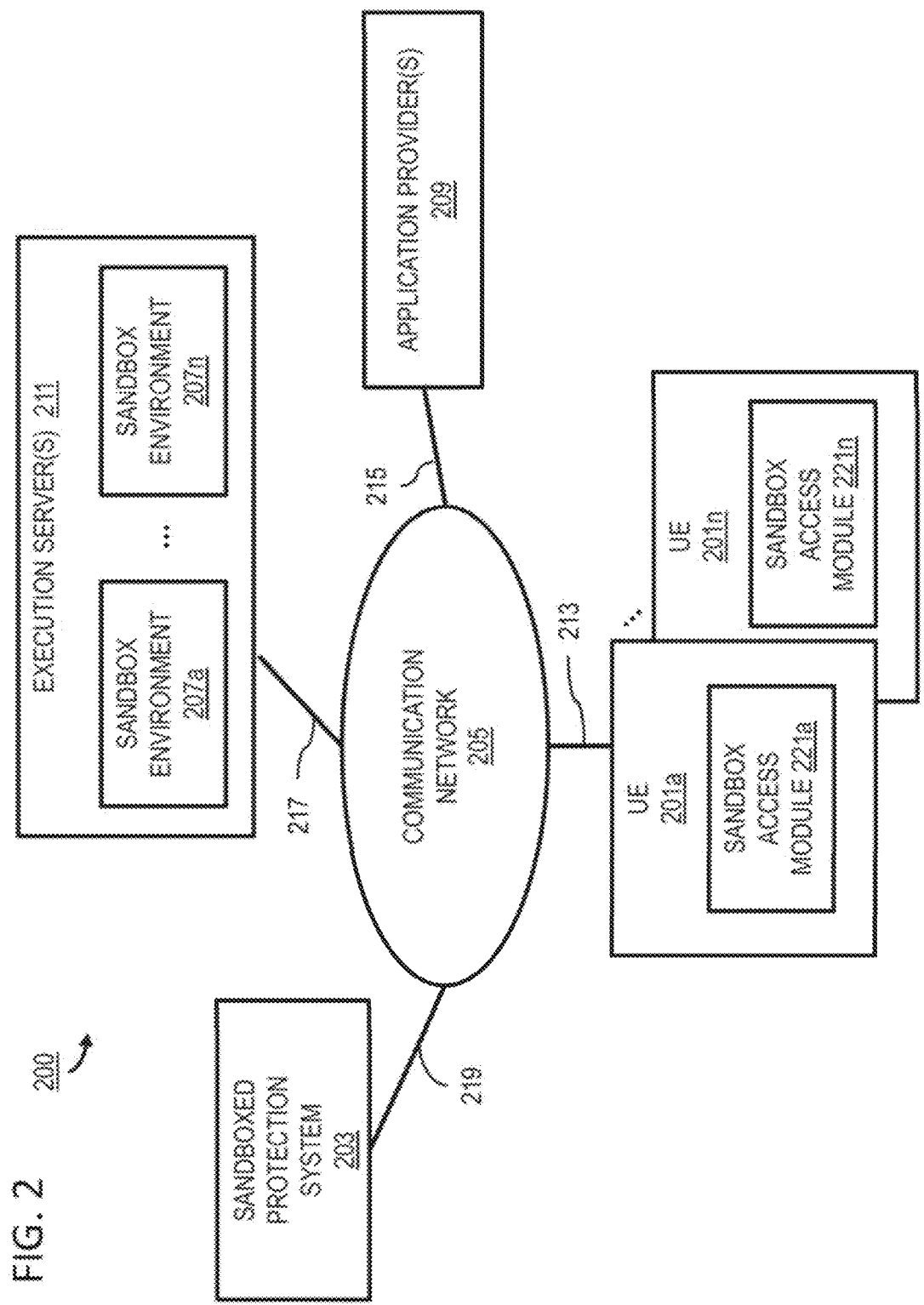
FIG. 2 is a schematic block diagram of a computer network system to control and detect malicious content, according to an embodiment.

FIG. 2 is a schematic block diagram of a computer network system to control and detect malicious content, according to an embodiment. In some instances, a computer network system 200 can include one or more user devices or user equipments (UEs) 201a-201n. UEs 201a-201n can be structurally and/or functionally similar to UE 101a of FIG. 1A. The computer network system 200 further includes a sandboxed protection system 203 (structurally and/or functionally similar to the sandboxed protection system 121a of FIG. 1A), one or more application provider(s) 209, one or more execution server(s) 211, each of which can be operatively coupled to each other via a communication network 205. Thus, FIGS. 1A and 1B are merely examples illustrating the types of devices that can be included within a computer network system 200.

In some instances, the sandbox protection system 203 can control the sandbox environments 207a-207n via the communication network 205. In such instances, control signals can be sent between the sandbox protection system 203 and the sandbox environments 207a-207n via the communication network 205. For example, the sandbox environments 207a-207n can be running on an execution server 211 that a user of UE 201a-201n can access remotely by a sandbox access module 221a-221n via the communication network 205. Each UE 201a-201n has access to a sandbox environment 207a-207n located within one or more execution server(s) 211. The sandbox environments 207a-207n are structurally and/or functionally similar to the sandbox environment 105a and 105b of FIGS. 1A and 1B.

In some embodiments, the sandboxed protection system 203 can be operatively coupled to the UEs 201a-201n via, for example, a communication network 205. In such embodiments, control signals can be sent between the sandboxed protection system 203 and the UEs 201a-201n via the communication network 205. As previously discussed, the sandboxed protection system 203 and its components may be located anywhere within a communication network system 205 including, but not limited to, within the UEs 201a-201n, or in separate locations within the communication network system 205.

The execution server(s) 211 are equipped with one or more processors and one or more data storages (e.g., memories). A storage location on the execution server(s) 211 can be associated with the UE 201a as a sandbox environment 201. For example, the UE 201a may have access to a sandbox environment 207a installed on the execution server(s) 211 such that the UE 201a can access the sandbox environment 207a via the communication network 205 and can execute applications and/or processes within the sandbox environment 207a on the execution server(s) 211. In this example, the UE 201a can initiate downloading an application from the application provider(s) 209 into the sandbox environment 207a (on the execution server(s) 211). The UE 201a can then initiate execution of the application on the execution server(s) 211. The sandbox protection system 203 can control the execution of the downloaded application on the execution server(s) 211 via the communication network 205.

Communication network 205 can be any communication network, such as the Internet, an Intranet, a Local Area Network (LAN), a Wide Area Network (WAN), a telephone network, an Ethernet network, a fiber-optic network, a wireless network, a cellular network, etc., configurable to allow the one or more UEs 201a-201n, the sandboxed protection system 203, the one or more application provider(s) 209, and the one or more execution server(s) 211 to communicate with communication network 205 and/or to each other through communication network 205.

In some instances, communication network 205 can include multiple networks operatively coupled to one another by, for example, network bridges, routers, switches and/or gateways. For example, the UEs 201a-201n can be operatively coupled to a cellular network and the application provider(s) 209, the sandboxed protection system 203, and/or the one or more execution server(s) 211 can be operatively coupled to a fiber-optic network. The cellular network and the fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 2, UEs 201a-201n are operatively coupled to communication network 205 via network connection 213; application provider(s) 209 are operatively coupled to communication network 205 via network connection 215; execution server(s) 211 are operatively coupled to communication network 205 via network connection 217; and the sandboxed protection system 203 is operatively coupled to communication network 205 via network connection 219. Network connections 213, 215, 217, and 219 can be any appropriate network connection for operatively coupling UEs 201a-201n, application provider(s) 209, execution server(s) 211, and the sandboxed protection system 203.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 200 can include more than one UE 201a-201n, more than one sandboxed protection system 203, more than one application provider(s) 209, and more than one execution server(s) 211. A UE 201a-201n, a sandboxed protection system 203, an application provider 209, and/or an execution server(s) 211 can be operatively coupled to the communication network 205 by heterogeneous network connections. For example, a first UE 201a-201n can be operatively coupled to the communication network 205 by a WWAN network connection, a second UE 201a-201n can be operatively coupled to the communication network 205 by a DSL network connection, and a sandboxed protection system 203 can be operatively coupled to the communication network 205 by a fiber-optic network connection.

The application provider(s) 209 can be, for example, a web server configured to provide various applications to electronic devices, such as UEs 201a-201n. For example, the UE 201a-201n can be in communication with the application provider(s) 209 via the communication network 205 under the supervision of the sandboxed protection system 203.

The UEs 201a-201n can be any of a variety of electronic devices that can be operatively coupled to communication network 205. A UE 201a-201n can be a personal computer, a laptop computer, a personal digital assistant (PDA), a cellular telephone, a portable/mobile internet device and/or some other electronic communication device. The UEs 201a-201n can include a web browser configured to access a webpage or website hosted on or accessible via the application provider(s) 209 over communication network 205. The UEs 201a-201n can be configured to support, for example, HTML using JavaScript. For example, the UEs 201a-201n can include a web browser, such as, Firefox, Safari, Opera and Chrome. An Internet page or website can be accessed by a user of a web browser at a UE 201a-201n by providing the web browser with a reference such as a uniform resource locator (URL), for example, of a webpage. For example, a user of a UE 201a-201n can access an application provider 209 via a URL designated for the application provider 209. In some instances, UEs 201a-201n can include specialized software for accessing a web server other than a browser, such as, for example, a specialized network-enabled application or program.

In some instances, portions of a website accessible via a web server, for example an application provider 209, can be located in an execution server(s) 211 accessible to the application provider 209. A memory, within the execution server(s) 211, can be at least one of a database, a data warehouse, and/or the like. A UE 201a-201n can also include a display, monitor or user interface (UI), a keyboard, various ports (e.g., a USB port), and other user interface features, such as, for example, touch screen controls, audio components, and/or video components (each not shown). A UE 201a-201n can be operatively coupled to communication network 205 via the UI and network connection 213.

Figure 3:
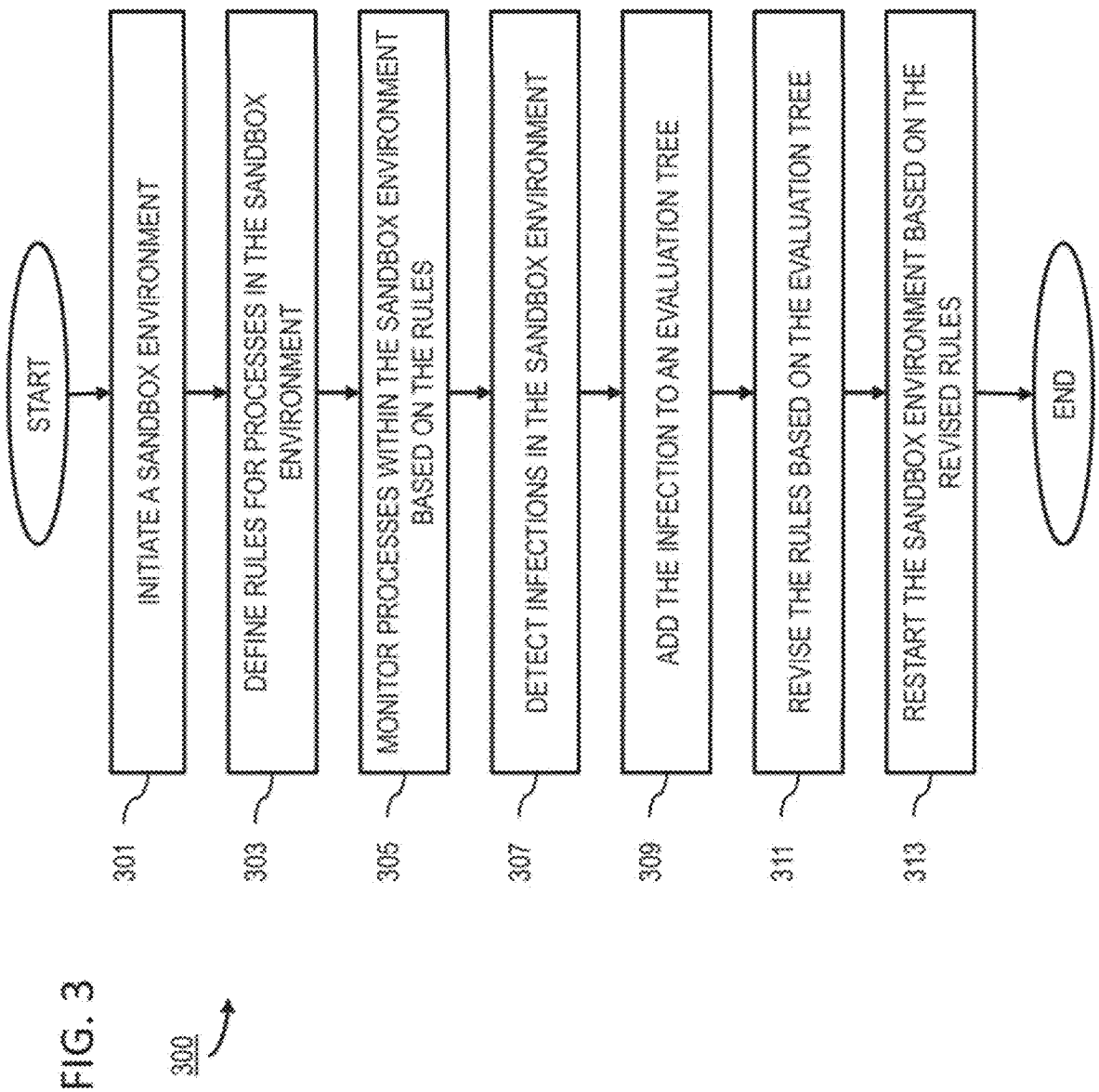
FIG. 3 is a flowchart of a process for implementing a sandboxed protection system, according to an embodiment.

FIG. 3 is a flowchart of a process for implementing a sandboxed protection system, according to an embodiment. In one embodiment, the sandboxed protection system 121a of FIG. 1A executes the process 300. Additionally, processor-readable instructions to execute the process can be stored in data store 109a and/or in data store 135. At step 301, the sandbox control module 123a initiates a sandbox environment 105a. The sandbox environment 105a can, for example, be executed within the host operating system 103 that runs on a processor of the UE 101a. Furthermore, the sandbox environment 105a can be configured to execute applications and/or processes such as, for example, a web browser or any other application, process and/or service at risk of receiving malicious content.

At 303, a set of rules for processes within the sandbox environment 105a is defined by the rule generation module 133. The rules can include, for example, classifying processes and/or applications using trust classifications provided by the trust classification module 137. In some instances, the rules can include predefined rules for the system and/or custom defined rules by a system administrator. The rules are stored in the rules database 136a.

At 305, the sandbox monitor module 125a monitors events and activities associated with running applications and/or processes within the sandbox environment 105a, based on the rules associated with the applications and/or processes. The sandbox processes can be monitored based on the rules in the rules database 136a. The sandbox monitor module 125a can report any anomalous event or activity to the event engine module 127a.

At 307 the event engine module 127a analyzes the report received from the sandbox monitor module 125a with reference to the associated rules in the rules database 136a to determine whether the anomalous behavior is malicious. The event engine module 127a can declares an infection based on the detected malicious behavior and the rules of the rules database 136a.

At 309, the event engine module 127a adds the detected infection to an evaluation tree within the data store 135. The evaluation tree can be used for further analysis of the infection by the sandboxed protection system 121a or by a system administrator. The analysis results can be used by the rule generation module 133 for updating the rules database 136a.

In some instances, (not shown in FIG. 3), the sandboxed protection system 121a can automatically and/or dynamically disable and/or ignore an infection detection. Disabling and/or ignoring detection events can be used, for example, in cases where some events are generated intentionally that otherwise would trigger the event engine module 127a to report an infection. For example, if a user of UE 101a intentionally runs an unknown process such as an application or an installer in the sandbox environment 105a without previously defining rules to trust the process.

At 311, the rule generation module 133 revises the rules in the rules database 136a based on the detected infections reported as the evaluation tree. In some instances, the rule generation module 133 can automatically revise the rules in the rules database 136a based on the monitored behavior of the sandbox environment 105a by the sandbox monitor module 125a and the analysis of the monitored behavior, including the infections detected by the event engine module 127a. In other instances, a system administrator can manually revise the rules based on the detected infections, evaluation tree content, etc. In still other instances, the rules may remain unchanged based on the infection.

At 313, the sandboxed control module 123a restarts the sandbox environment 105a, such that the infected environment can be terminated and a new clean sandbox environment 105a can be restarted. The process of monitoring the sandbox environment 105a by the sandbox monitor module 125a based on the rules of the rules database 136a can then continue with the clean sandbox environment 105a. Alternatively, the sandbox control module 123a can terminate and/or restart the application, process and/or service with malicious behavior without restarting the sandbox environment 105a.

Figure 4:
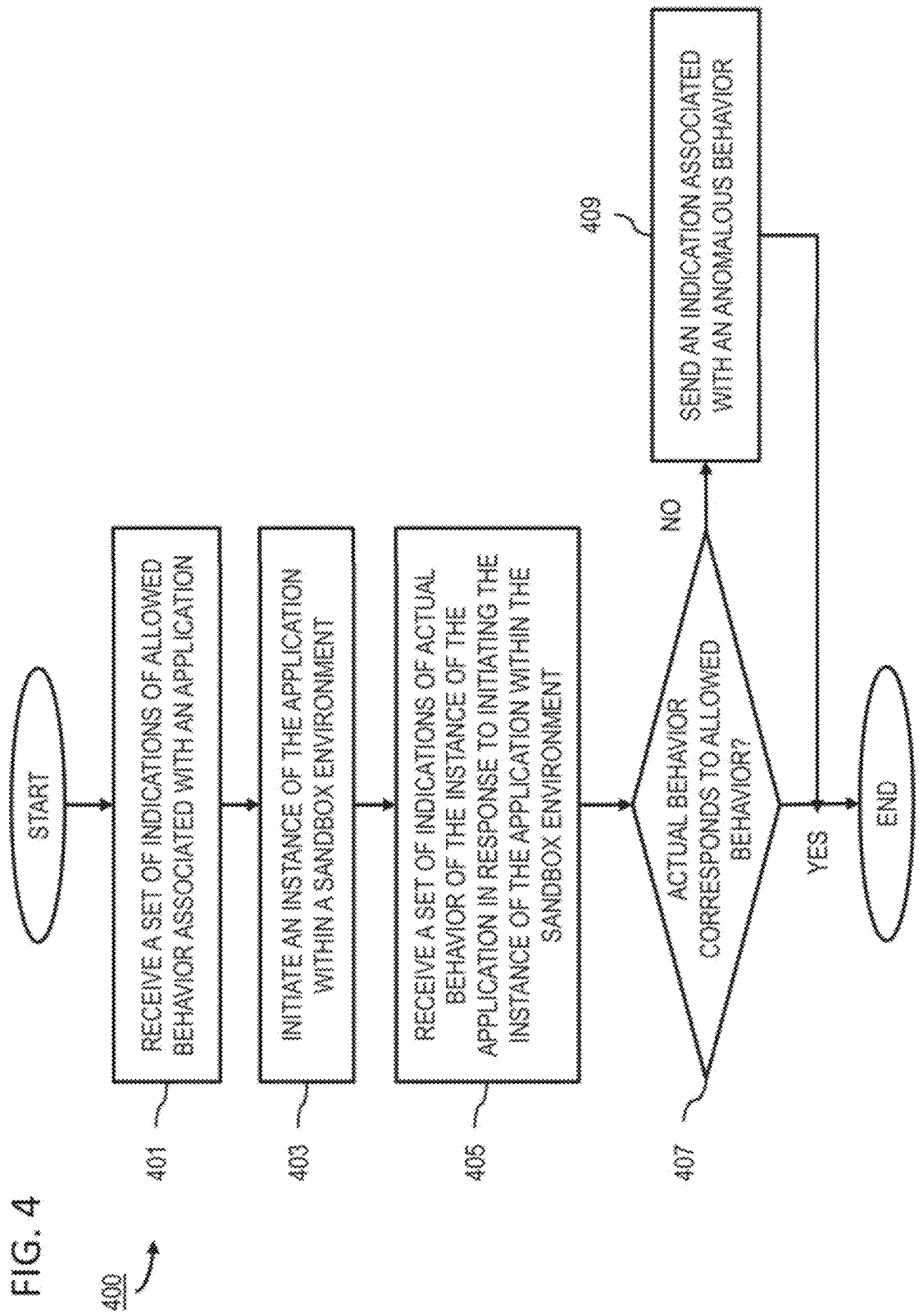
FIG. 4 is a flowchart of a process for control and detection of malicious behavior of an application based on allowed behavior, according to an embodiment.

FIG. 4 is a flowchart of a process for control and detection of malicious behavior of an application based on allowed behavior, according to an embodiment. In some instances, at 401 the application control module 123a can execute a code to receive a set of indications of allowed behavior associated with an application, based on a set of rules in the rules database 136a. The application control module 123a can, for example, retrieve the indications from data store 135, receive the indications from a system administrator via input signal 139, and/or the like. The application control module 123a can store the received indications in data store 135. At 403, the application control module 123a sends a signal to the host operating system 103 via output signal 141 to initiate an instance of the application in the sandbox environment 105a.

At 405, the event engine module 127a, receives, from the sandbox monitor module 125a, a set of indications of actual behavior of the instance of the application within the sandbox environment 105a. The event engine module 127a can store the actual behavior indications in the data store 135.

At 407, the event engine module 127a analyzes the actual behavior of the instance of the application in comparison with the allowed behavior associated with the instance of the application in the data store 135, to detect correspondences and discrepancies. If the allowed behavior and the actual behavior correspond, the event engine module 127a can conclude that no infection has occurred and malicious behavior has not been detected.

If at least one indication from the set of indications of actual behavior does not correspond to an indication from the set of indications of allowed behavior, at 409 the event engine module 127a sends an indication associated with an anomalous behavior to the application control module 123a. The indication associated with the anomalous behavior can be used by the application control module 123a to terminate the application and/or to terminate sandbox environment's process, to send an indication of the anomalous behavior to a system administrator or to a user, and/or the like.

In some instances, the application control module 123a can send the indication associated with the anomalous behavior to the event engine module 127a, for example to define an evaluation tree. The evaluation tree including the indication associated with the anomalous behavior can be stored in data store 135 associated with the application, for example added to the rules database 136a associated with the application.

In some instances, the sandbox monitor module 125a can be configured to monitor at least one event of the instance of the application within the sandbox environment 105a such as, for example, process events (e.g., executing unauthorized processes) of the instance of the application, file events (e.g., access of unauthorized files) of the instance of the application, registry events (e.g., registry updates) of the instance of the application, network events (e.g., network connection events) of the instance of the application, or thread injection events (e.g., behavior associated with inserting and run executable code within the address space of another process) of the instance of the application, etc.

In some instances, the rule generation module 133 uses the anomalous behavior detected by the event engine module 127a and revises the set of indications (rules) of allowed behavior associated with the application. The revised set of rules can replace the set of rules in the rules database 136a.

In some instances, the indication associated with the anomalous behavior can include a trace associated with a source of the anomalous behavior. For example, the application can be a web browser application and the indication associated with the anomalous behavior can include a uniform resource locator (URL) trace associated with the web browser application. For another example, the source trace can include an identifier of an application, process, service and/or the like. The source trace enables the rule generation module 133 to revise the rules to enable the sandbox control module 123a to control application access to the sources that cause anomalous behavior of the application.

In some instances, the set of rules indicating allowed behavior associated with the application is based at least in part on a trust level associated with the application. The trust level can be defined by the trust classification module 137 based on, for example, user input, previous behavior of the application (e.g., history of actual behavior in data store 135), application type, etc. Furthermore, the set of indications of allowed behavior associated with the application can include an identifier of a trusted process associated with the application.

In some instances, the sandbox monitor module 125a can monitor activities of an instance of an application within the sandbox environment 105a by tracing network activities of the running instance of the application within the sandbox environment 105a. The sandbox monitor module 125a can also monitor one or more executable files of the instance of the application.

Figure 5:
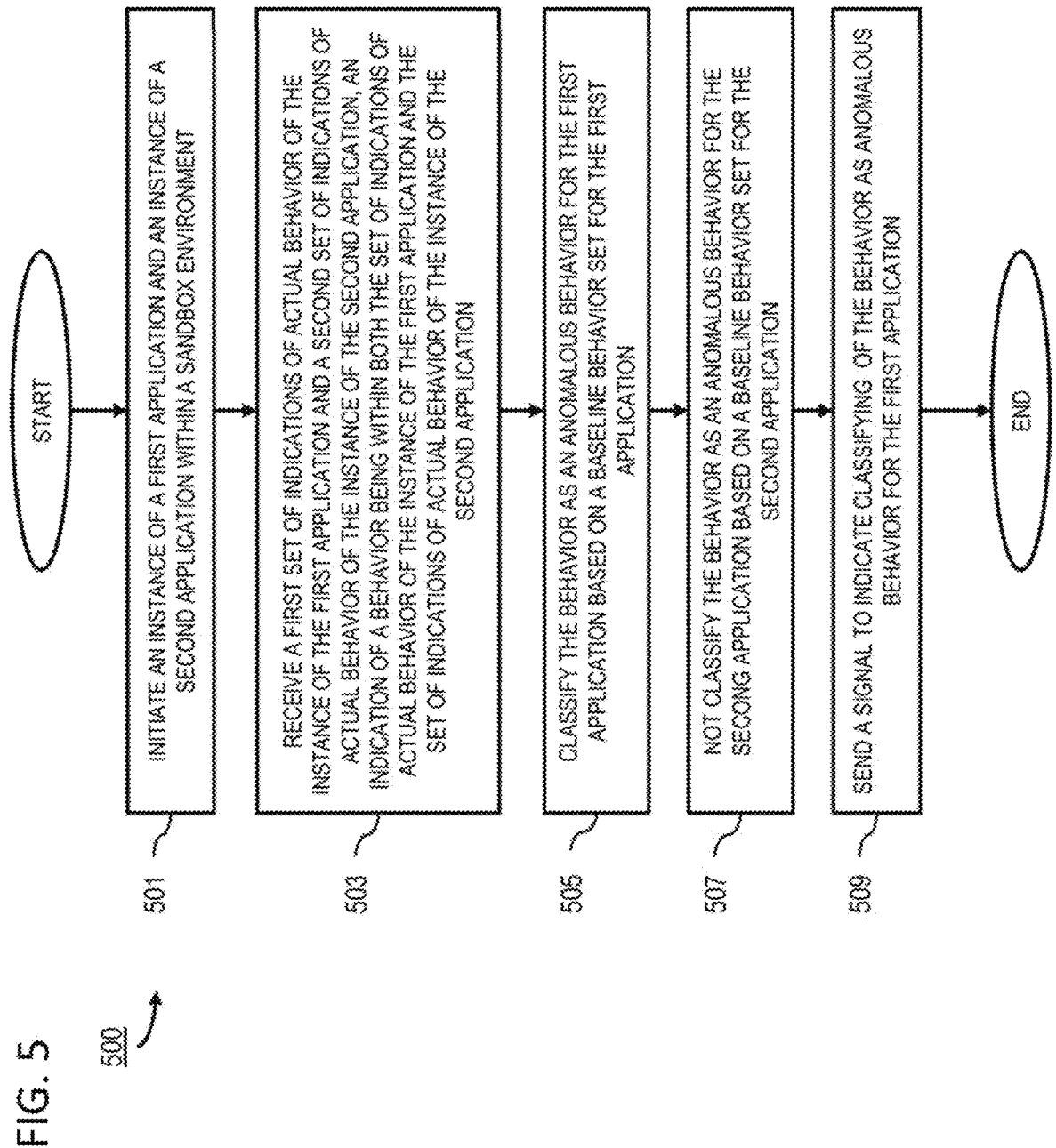
FIG. 5 is a flowchart of a process for control and detection of malicious behavior of an application based on application type, according to an embodiment.

FIG. 5 is a flowchart of a process for control and detection of malicious behavior of an application based on application type, according to an embodiment. The sandbox environment 105a can have multiple instances or different applications or instances of the same application running simultaneously. The sandbox monitor 125a and the application control module 123a can monitor and control the running applications. As shown in FIG. 5, at 501 the application control module 123a initiates an instance of a first application and an instance of a second application within a sandbox environment 105a.

At 503 the event engine module 127a receives, from a sandbox monitor module 125a associated with the sandbox environment 105a, a set of indications of actual behavior of the instance of the first application and a set of indications of actual behavior of the instance of the second application. The first application and the second application can be from the same application type (two instances of the same application running simultaneously on sandbox environment 105a) or from different application types (two different applications running simultaneously on sandbox environment 105a). In some instances, the set of indications of actual behavior of the instance of the first application and the set of indications of actual behavior of the instance of the second application can overlap such that the instance of the first application and the instance of the second application may show the same actual behavior. However, the same actual behavior that can be declared as anomalous behavior for an instance of the first application can be declared as an allowed behavior for an instance of the second application, or vice versa.

At 505, the event engine module 127a checks the rules database 136a to find a baseline behavior set for the first application (e.g., a set of allowed behavior for the first application). If the actual behavior is an anomalous behavior for the first application based on the baseline behavior set for the first application in the rules database 136a, the event engine module 127a classifies the actual behavior as anomalous behavior for the first application.

At 507 the event engine module 127a checks the rules database 136a to find a baseline behavior set for the second application. If the actual behavior is not an anomalous behavior for the second application based on the baseline behavior set for the second application (e.g., a set of allowed behavior for the second application) in the rules database 136a, event engine module 127a does not classify the actual behavior as anomalous behavior for the second application.

For example, the event engine module 127a can classify a behavior B as an anomalous behavior for the first application based on a baseline behavior set for the first application, but not classify the behavior B as an anomalous behavior for the second application based on a baseline behavior set for the second application.

Note that, as shown in FIG. 2, the sandboxed protection system 203 can be located within the UEs 201a-201n, or in a separate location coupled with the UEs 201a-201n via the communication network 205. Therefore, in some instances, as shown in FIG. 2, the sandboxed protection module 203 can include the sandbox environments 207a-207n.

In some instances, the sandbox control module 123a can be operatively coupled to the sandbox environment 105a via a network. For example, as shown in FIG. 2, the sandboxed protection system 203 that includes the sandbox control module 123a is coupled to the UEs 201a-201n, that include sandbox environments 207a-207n, via communication network 205 by network connections 213 and 219.

In some instances, the set of indications of actual behavior of the instance of the first (or second) application includes at least one of a process event identifier of the instance of the first (or second) application, a file event identifier of the instance of the first (second) application, a registry event identifier of the instance of the first (or second) application or a network event identifier of the instance of the first (second) application.

At 509, the event engine module 127a can send a signal to other components of the sandboxed protection system 121a such as the application control module 123a to indicate classifying of the actual behavior as anomalous behavior for the first application. The application control module 123a can send a signal to initiate actions such as first application termination, sandbox environment 105a termination, notifying a system administrator or a user about the anomalous behavior, etc.

Figure 6:
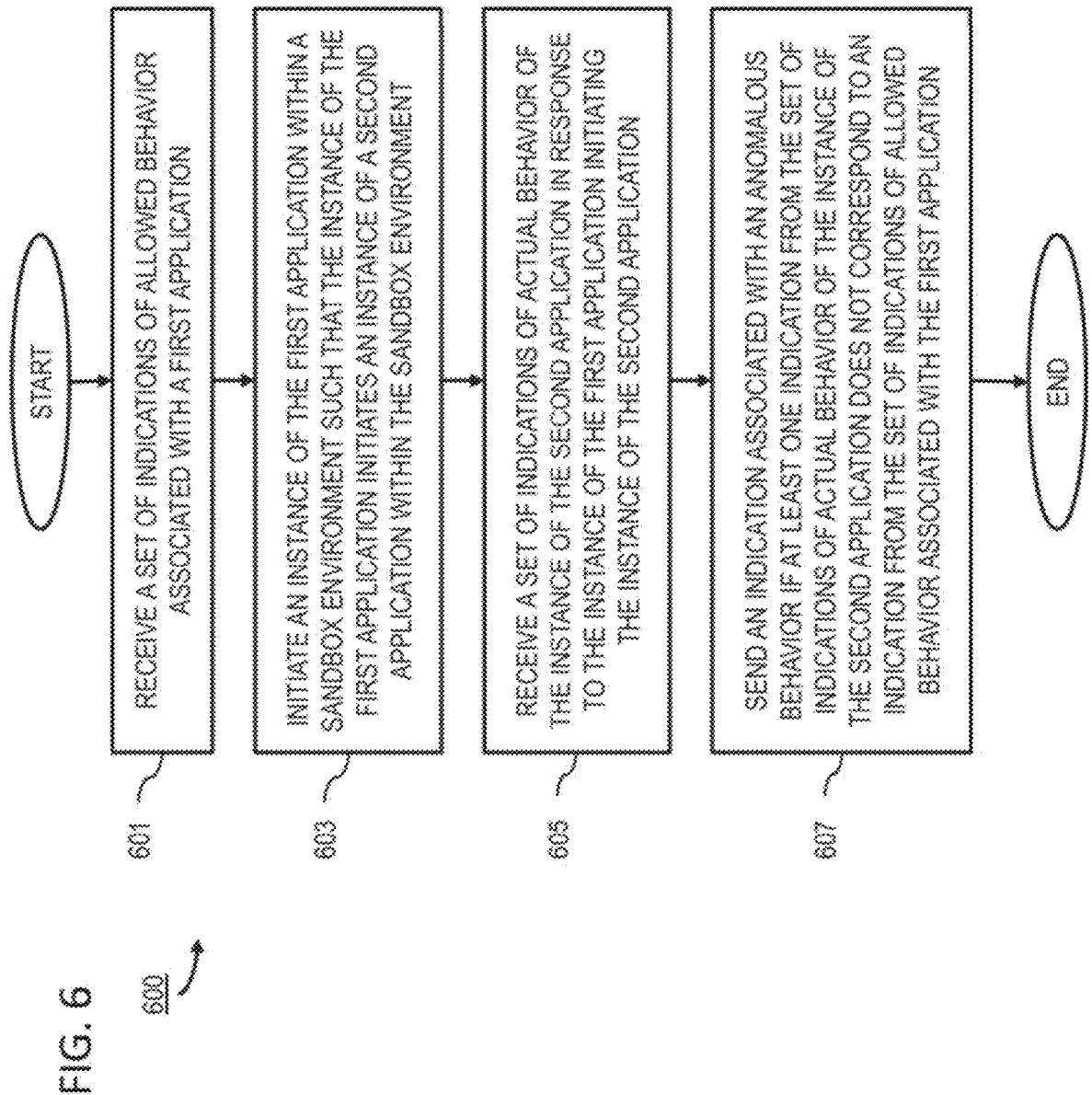
FIG. 6 is a flowchart of a process for control and detection of malicious behavior of an application based on another application, according to an embodiment.

FIG. 6 is a flowchart of a process for control and detection of malicious behavior of an application based on another application, according to an embodiment. In some instances, an application running within the sandbox environment 105a can initiate one or more other applications within the sandbox 135. At 601 the sandbox control module 123a receives, from a rules database 136a, a set of indications of allowed behavior associated with a first application.

At 603, the sandbox control module 123a initiates an instance of the first application within a sandbox environment 105a such that the instance of the first application initiates an instance of a second application within the sandbox environment 105a. For example, execution of the first application can start execution of a second application without an intervention by the application control module 123a. The sandbox monitor module 125a can detect initiation of the second application and report the initiation to the application control module 123a and/or to the event engine module 127a.

At 605, event engine module 127a receives, from the sandbox monitor module 125a associated with the sandbox environment 105a, a set of indications of actual behavior of the instance of the second application, as previously discussed with regards to FIG. 5, in response to the instance of the first application initiating the instance of the second application. The first application and the second application can be from the same application type or from different application types.

If at least one indication from the set of indications of actual behavior of the instance of the second application does not correspond to an indication from the set of indications of allowed behavior associated with the first application, at 607, the event engine module 127a sends an indication associated with an anomalous behavior associated with the second application to the application control module 123a. The indication associated with the anomalous behavior can be used by the application control module 123a to terminate the second application and/or the sandbox environment process, etc. Furthermore, the event engine module 127a can add the anomalous behavior to an evaluation tree associated with the second application.

In some instances, the rule generation module 133 uses the anomalous behavior of the second application detected by the event engine module 127a and revises the set of indications (rules) of allowed behavior associated with the first application and/or the set of indications (rules) of allowed behavior associated with the second application. The revised set of indications can replace the set of indications in rules database 136a.

In some instances, the second application can be, for example, a web browser application and the indication associated with the anomalous behavior can include a uniform resource locator (URL) trace associated with the web browser application. The source trace enables the rule generation module 133 to revise the set of indications (rules) of allowed behavior associated with the first and/or second application such that access of second application to the sources that caused anomalous behavior can be controlled.

In some instances, the set of indications of allowed behavior associated with the first application is based at least in part on a trust level associated with the first application. The trust level can be defined by the trust classification module 137 based on, for example, user input, previous behavior of the first application (e.g., history of actual behavior in data store 135), first application type, previous behavior of the second application (e.g., history of actual behavior in data store 135), second application type, etc. Furthermore, the set of indications of allowed behavior associated with the first application can includes an identifier of a trusted process associated with the first application.

It is intended that the systems and methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. An apparatus, comprising:
a memory; and
a processor operatively coupled to the memory, the processor configured to receive a set of indications of allowed behavior specific to an application, the processor configured to initiate an instance of the application within a sandbox environment,
the processor configured to receive, from a monitor associated with the sandbox environment, an indication that the instance of the application is attempting to modify a sensitive file path, the processor configured to classify the attempting to modify the sensitive file path as an anomalous behavior for the application based on an indication of modifying the sensitive file path not being in the set of indications of allowed behavior specific to the application,
the processor configured to define and store a signature for the application using a cryptographic hash value of a file associated with the application in response to classifying the attempting to modify the sensitive file path as an anomalous behavior for the application.

2. The apparatus of claim 1, wherein the processor is configured to terminate the application in response to classifying the attempting to modify the sensitive file path as an anomalous behavior for the application.

3. The apparatus of claim 1, wherein the application is a first application, the processor is configured to initiate the instance of the first application within the sandbox environment based on an instruction from an instance of a second application to initiate the instance of the first application, the set of indications of allowed behavior specific to the first application being based on a set of indications of allowed behavior specific to the second application.

4. The apparatus of claim 1, wherein the application is a first application, the processor configured to initiate an instance of a second application within the sandbox environment, the processor configured to receive, from the monitor associated with the sandbox environment, an indication that the instance of the second application is attempting to modify the sensitive file path, the processor configured to allow the instance of the second application to modify the sensitive file path based on an indication of modifying the sensitive file path being within a set of indications of allowed behavior specific to the second application.

5. The apparatus of claim 1, wherein the indication that the instance of the application is attempting to modify the sensitive file path includes a trace associated with a source of an instruction causing the instance of the application to attempt to modify the sensitive file path.

6. The apparatus of claim 1, wherein the application is a first application, the processor is configured to initiate the instance of the first application within the sandbox environment based on the sandbox environment recognizing the first application, the processor is configured to exclude an instance of a second application from executing within the sandbox environment based on the sandbox environment not recognizing the second application.

7. The apparatus of claim 1, wherein the set of indications of allowed behavior specific to the application is defined and associated with the application prior to initiating the instance of the application within the sandbox environment.

8. The apparatus of claim 1, wherein the sensitive file path is a first sensitive file path, the processor configured to receive, from the monitor associated with the sandbox environment, an indication that the instance of the application is attempting to modify a second sensitive file path different from the first sensitive file path, the processor configured to allow the instance of the application to modify the second sensitive file path based on an indication of modifying the second sensitive file path being within the set of indications of allowed behavior specific to the application.

9. A method, comprising:
receiving a set of indications of allowed behavior specific to an application;
initiating an instance of the application within a sandbox environment;
receiving, from a monitor associated with the sandbox environment, an indication that the instance of the application is attempting to modify a sensitive file path; and
terminating the instance of the application based on an indication of the modifying the sensitive file path not being within the set of indications of allowed behavior specific to the application.

10. The method of claim 9, wherein the sensitive file path is a first sensitive file path, the method further comprising:
receiving, from the monitor associated with the sandbox environment, an indication that the instance of the application is attempting to modify a second sensitive file path different from the first sensitive file path; and
allowing the instance of the application to modify the second sensitive file path based on an indication of modifying the second sensitive file path being within the set of indications of allowed behavior specific to the application.

11. The method of claim 9, wherein the application is a first application, the initiating includes initiating the instance of the first application within the sandbox environment based on an instruction from an instance of a second application to initiate the instance of the first application, the set of indications of allowed behavior specific to the first application being based on a set of indications of allowed behavior specific to the second application.

12. The method of claim 9, further comprising:
defining and storing a signature for the application using a cryptographic hash value of a file associated with the application in response to classifying the attempting to modify the sensitive file path as an anomalous behavior for the application.

13. The method of claim 9, wherein the application is a first application, the initiating including initiating the instance of the first application within the sandbox environment based on the sandbox environment recognizing the first application, the method further comprising:
excluding an instance of a second application from executing within the sandbox environment based on the sandbox environment not recognizing the second application.

14. The method of claim 9, wherein the indication that the instance of the application is attempting to modify the sensitive file path includes a trace associated with a source of an instruction causing the instance of the application to attempt to modify the sensitive file path.

15. The method of claim 9, wherein the application is a first application, the method further comprising:
receiving, from the monitor associated with the sandbox environment, an indication that an instance of a second application is attempting to modify the sensitive file path; and
allowing the instance of the second application to modify the sensitive file path based on an indication of modifying the sensitive file path being within the set of indications of allowed behavior specific to the second application.

16. A non-transitory processor-readable medium storing code representing instructions to be executed by a processor, the instructions comprising code to cause the processor to:
receive a set of indications of allowed behavior specific to an application;
initiate an instance of the application within a sandbox environment;
receive, from a monitor associated with the sandbox environment, an indication that the instance of the application is attempting to at least one of delete, rename or overwrite an executable file; and
terminate the instance of the application based on an indication of the at least one of deleting, renaming or overwriting the executable file not being within the set of indications of allowed behavior specific to the application.

17. The non-transitory processor-readable medium of claim 16, wherein the executable file is a first executable file, the code further comprising code to cause the processor to:
receive, from the monitor associated with the sandbox environment, an indication that the instance of the application is attempting to at least one of delete, rename or overwrite a second executable file different from the first executable file; and
allow the instance of the application to the at least one of delete, rename or overwrite the second executable file based on an indication of the at least one of deleting, renaming or overwriting the second executable file being within the set of indications of allowed behavior specific to the application.

18. The non-transitory processor-readable medium of claim 16, wherein the application is a first application, the code to cause the processor to initiate includes code to cause the processor to initiate the instance of the first application within the sandbox environment based on an instruction from an instance of a second application to initiate the instance of the first application, the set of indications of allowed behavior specific to the first application being based on a set of indications of allowed behavior specific to the second application.

19. The non-transitory processor-readable medium of claim 16, further comprising code to cause the processor to:

define and store a signature for the application using a cryptographic hash value of a file associated with the application in response to classifying the attempting to at least one of delete, rename or overwrite the executable file as an anomalous behavior for the application.

20. The non-transitory processor-readable medium of claim 16, wherein the application is a first application, the code to cause the processor to initiate includes code to cause the processor to initiate the instance of the first application within the sandbox environment based on the sandbox environment recognizing the first application, the code further comprising code to cause the processor to exclude an instance of a second application from executing within the sandbox environment based on the sandbox environment not recognizing the second application.

21. The non-transitory processor-readable medium of claim 16, wherein the indication that the instance of the application is attempting to at least one of delete, rename or overwrite the executable file includes a trace associated with a source of an instruction causing the instance of the application to attempt to at least one of delete, rename or overwrite the executable file.

22. The non-transitory processor-readable medium of claim 16, wherein the application is a first application, the code further comprising code to cause the processor to:

receive, from the monitor associated with the sandbox environment, an indication that an instance of a second application is attempting to at least one of delete, rename or overwrite the executable file; and allow the instance of the second application to the at least one of delete, rename or overwrite the executable file based on an indication of the at least one of deleting, renaming or overwriting the executable file being within the set of indications of allowed behavior specific to the second application.

* * * * *